US009090143B2

United States Patent
Ishikawa

(10) Patent No.: US 9,090,143 B2
(45) Date of Patent: Jul. 28, 2015

(54) VEHICLE AIR CONDITIONER FOOT AND REAR VENT DOOR ARRANGEMENT

(75) Inventor: Tsugutaka Ishikawa, Saitama (JP)

(73) Assignee: CALSONIC KANSEI CORPORATION, Saitama (JP)

(*) Notice: Subject to any disclaimer, the term of this patent is extended or adjusted under 35 U.S.C. 154(b) by 1836 days.

(21) Appl. No.: 12/310,491

(22) PCT Filed: Oct. 26, 2007

(86) PCT No.: PCT/JP2007/070894
§ 371 (c)(1),
(2), (4) Date: Feb. 26, 2009

(87) PCT Pub. No.: WO2008/050856
PCT Pub. Date: May 2, 2008

(65) Prior Publication Data
US 2009/0250193 A1 Oct. 8, 2009

(30) Foreign Application Priority Data

Oct. 27, 2006 (JP) .................................. 2006-291975
Oct. 27, 2006 (JP) .................................. 2006-291976

(51) Int. Cl.
*B60H 1/00* (2006.01)
*B60H 3/00* (2006.01)

(52) U.S. Cl.
CPC ........ *B60H 1/00028* (2013.01); *B60H 1/00857* (2013.01); *B60H 2001/002* (2013.01); *B60H 2001/00092* (2013.01)

(58) Field of Classification Search
USPC ............... 165/41, 42, 202, 203, 204
See application file for complete search history.

(56) References Cited

U.S. PATENT DOCUMENTS

| 5,016,704 A | * | 5/1991 | Ono ............................ 165/203 |
| 6,702,008 B1 | * | 3/2004 | Hibino et al. ................ 165/202 |
| 2004/0194948 A1 | | 10/2004 | Shibata et al. |

FOREIGN PATENT DOCUMENTS

| DE | 197 57 280 | 7/1998 |
| EP | 1 787 836 | 5/2007 |
| GB | 2 311 850 | 10/1997 |

(Continued)

OTHER PUBLICATIONS

Supplementary European Search Report issued Sep. 21, 2009 in EP 07 83 0628.

(Continued)

*Primary Examiner* — Travis Ruby
(74) *Attorney, Agent, or Firm* — Wenderoth, Lind & Ponack, L.L.P.

(57) ABSTRACT

In an air conditioner for a vehicle and including a heat exchanger for cooling, an air mix door, and a heat exchanger for heating arranged in an air conditioner casing in that order from an upstream fan side toward a downstream side and a rear vent outlet path and a foot outlet path branching out via an air mix chamber for mixing, cold air and hot air, an air distribution amount adjustment blade for adjusting an amount of air distribution from the air mix chamber is provided in the rear vent outlet path, a foot door a door opening degree of which is controlled according to a selected mode is provided in the foot outlet path, and the air distribution amount adjustment blade is a blade in operative association with door open/close operation of the foot door and for limiting the amount of air distribution to the rear vent outlet path when the door opening degree of the foot door is large.

6 Claims, 15 Drawing Sheets

(56) References Cited

FOREIGN PATENT DOCUMENTS

| JP | 59-9914 | 1/1984 |
|---|---|---|
| JP | 6-92135 | 4/1994 |
| JP | 9-267620 | 10/1997 |
| JP | 11-222021 | 8/1999 |
| JP | 2004-243881 | 9/2004 |
| JP | 2004-268906 | 9/2004 |
| JP | 2005-225445 | 8/2005 |

OTHER PUBLICATIONS

International Search Report issued Jan. 22, 2008 in the International (PCT) Application of which the present application is the U.S. National Stage.

\* cited by examiner

VENT

SECTION B-B

SECTION A-A

B/L

SECTION B-B

SECTION A-A

D/F1

D/F2

SECTION B-B

SECTION A-A

VENT

SECTION B-B

SECTION A-A

B/L

SECTION B-B

SECTION A-A

VEHICLE AIR CONDITIONER FOOT AND REAR VENT DOOR ARRANGEMENT

TECHNICAL FIELD

The present invention relates to an air conditioner for a vehicle and including, in an air conditioner casing, rear vent outlet paths and foot outlet paths branching out via an air mix chamber for mixing cold air and hot air.

BACKGROUND TECHNIQUE

There is a conventionally known air conditioner for a vehicle in which rear vent doors and foot doors with independently controlled door opening degrees are provided respectively in rear vent outlet paths and foot outlet paths formed in an air conditioner casing (see Japanese Patent Application Laid-Open (JP-A) No. 6-92135, for example).

There is also a known air conditioner for a vehicle in which doors are not provided in rear vent outlet paths formed in an air conditioner casing and foot doors are provided only in foot outlet paths (see JP-A No. 9-267620, for example).

In the air conditioner for the vehicle described in JP-A No. 6-92135, however, the rear vent doors and the foot doors with independently controlled door opening degrees are provided respectively in the rear vent outlet paths and the foot outlet paths and therefore special door links need to be provided to the respective doors, which increases cost and impairs space-saving property.

In the air conditioner for the vehicle described in JP-A No. 9-267620, the foot doors are provided only in the foot outlet paths. Therefore, if the rear vent outlet paths and the foot outlet paths branching out via an air mix chamber for mixing cold air and hot air are provided in the air conditioner unit, foot outlet air distribution amounts become insufficient when a bi-level mode or a defroster/foot mode for carrying out both foot outlet air distribution and rear vent outlet air distribution is selected.

In other words, if a plurality of outlet paths branch out via the air mix chamber, amounts of air distribution to the respective outlet paths are determined by path resistances. The path resistances are higher in the foot outlet paths curved in complicated manners than in the rear vent outlet paths curved in simple manners. Therefore, even if the foot doors are fully open, amounts of air distribution to the rear vent outlet paths having the lower path resistances become greater. As a result, foot outlet air distribution amounts become relatively insufficient.

The present invention has been made with the above problems in view and it is an object of the invention to provide an air conditioner for a vehicle, advantageous in cost and space-saving property, and capable of adjusting foot outlet air distribution amounts to proper and sufficient amounts when a mode for carrying out foot outlet air distribution and rear vent outlet air distribution is selected.

SUMMARY OF THE INVENTION

To achieve the above object, according to an embodiment of the invention, there is provided an air conditioner for a vehicle and including a heat exchanger for cooling, an air mix door, and a heat exchanger for heating arranged in an air conditioner casing in that order from an upstream fan side toward a downstream side and a rear vent outlet path and a foot outlet path branching out via an air mix chamber for mixing cold air and hot air, wherein an air distribution amount adjustment blade for adjusting an amount of air distribution from the air mix chamber is provided in the rear vent outlet path, a foot door a door opening degree of which is controlled according to a selected mode is provided in the foot outlet path, and the air distribution amount adjustment blade is a blade in operative association with door open/close operation of the foot door and for limiting the amount of air distribution to the rear vent outlet path when the door opening degree of the foot door is large.

In the air conditioner for the vehicle according to the invention, because the air distribution amount adjustment blade is the blade in operative association with the door open/close operation of the foot door, special door links need not be provided to the rear vent door and the foot door, respectively, unlike the prior art, which reduces cost, improves space-saving property, and makes the air conditioner compact.

Moreover, the air distribution amount adjustment blade limits the amount of air distribution to the rear vent outlet path when the door opening degree of the foot door is large. Therefore, it is possible to prevent the foot outlet air distribution amount from becoming insufficient when a mode for carrying out both foot outlet air distribution and rear vent outlet air distribution is selected. In other words, if the air conditioner unit includes the rear vent outlet path and the foot outlet path branching out via the air mix chamber, path resistances in the rear vent outlet path and the foot outlet path determine air distribution amounts to the respective paths. By employing the air distribution amount adjustment blade in operative association with the foot door, coordinated control of the path resistances is carried out mechanically to maintain a proper relationship between the foot outlet air distribution amount and the rear vent outlet air distribution amount.

As a result, the air conditioner is advantageous in cost and space-saving property and can adjust the foot outlet air distribution amount to a proper and sufficient amount when the mode for carrying out the foot outlet air distribution and the rear vent outlet air distribution is selected.

EXPLANATION OF REFERENCE NUMERALS

Figure 1:
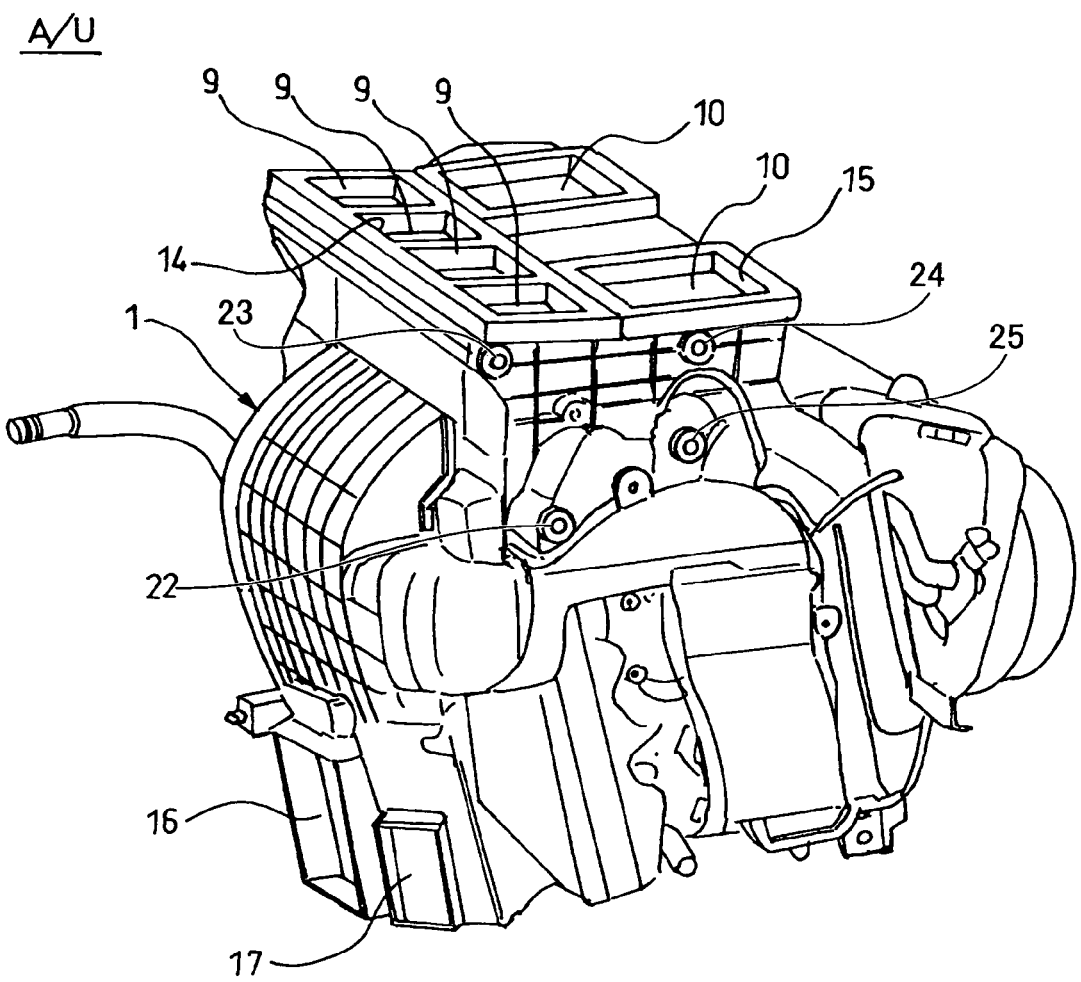
FIG. 1 is a general perspective view of an air conditioner unit A/U (an example of an air conditioner for a vehicle) of an embodiment 1.

A/U air conditioner unit (air conditioner for vehicle)
1 air conditioner casing
2 clean filter
3 evaporator (heat exchanger for cooling)
4 air mix door
5 heater core (heat exchanger for heating)
6 cold air bypass path
7 hot air path
8 air mix chamber
9 front vent door
10 defroster door
11 foot door
12 air distribution amount adjustment blade
13 temperature adjustment blade
14 front vent outlet
15 defroster outlet
16 rear vent outlet
17 foot outlet
18 rear vent outlet path
19 foot outlet path
20 door link mechanism
21 door actuator
22 foot door shaft
23 vent door shaft
24 defroster door shaft
25 temperature adjustment door shaft
26 main link shaft
27 main link
28 actuator lever
29 link lever
30 link rod
31 vent door link shaft
32 vent door link (first door link)
33 vent door lever
34 first pin
35 second pin
36 vent door link cam groove
37 vent door lever cam groove 37
41 foot door link shaft
42 foot door link
43 foot door lever (second door lever)
44 first pin
45 second pin
46 foot door link cam groove
47 foot door lever cam groove
71 vent door link extension portion (first link extension portion, link retaining device)
72 foot lever stopper portion (second lever stopper portion, link retaining device)

DETAILED DESCRIPTION OF THE INVENTION

The best mode for embodying an air conditioner for a vehicle according to the present invention will be described below based on embodiment 1 shown in the drawings.

Embodiment 1

First, the structure will be described.

Figure 2:
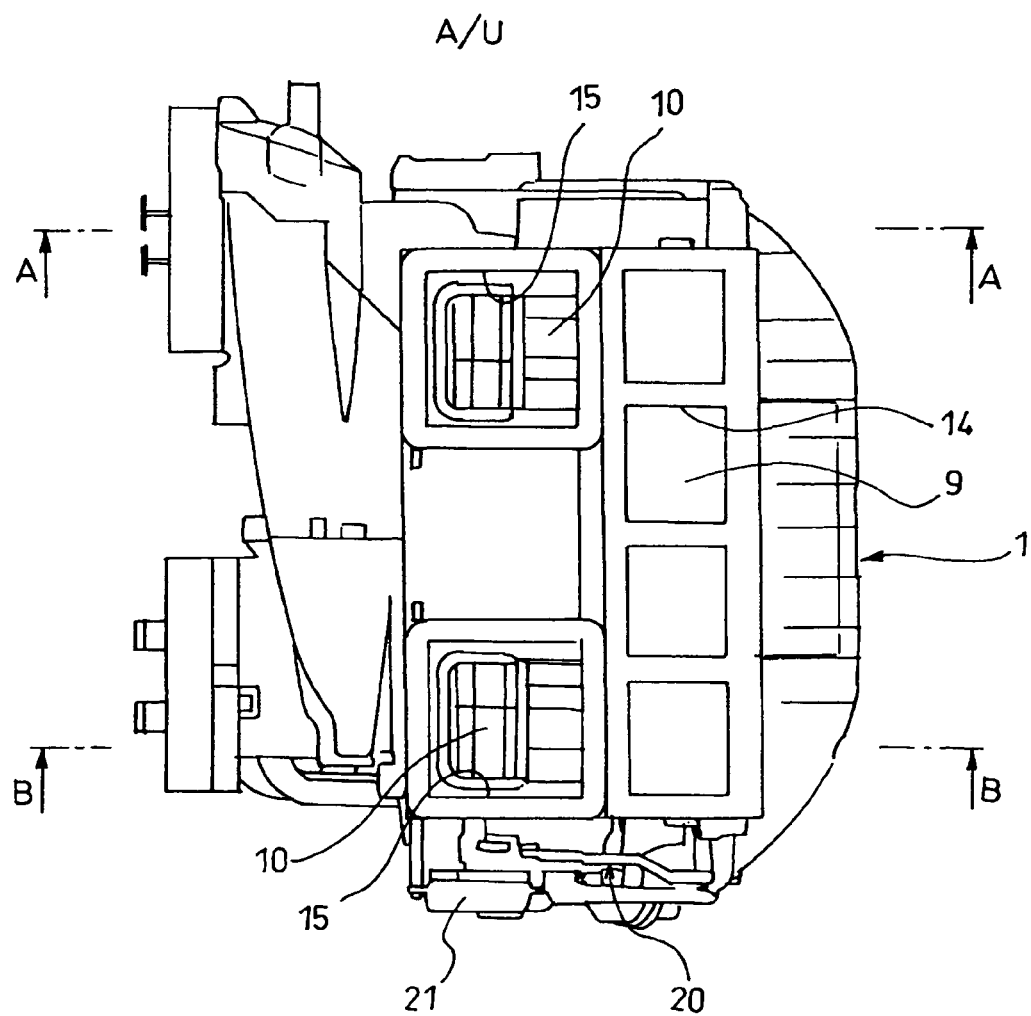
FIG. 2 is a plan view of the air conditioner unit A/U of the embodiment 1.
Figure 3:
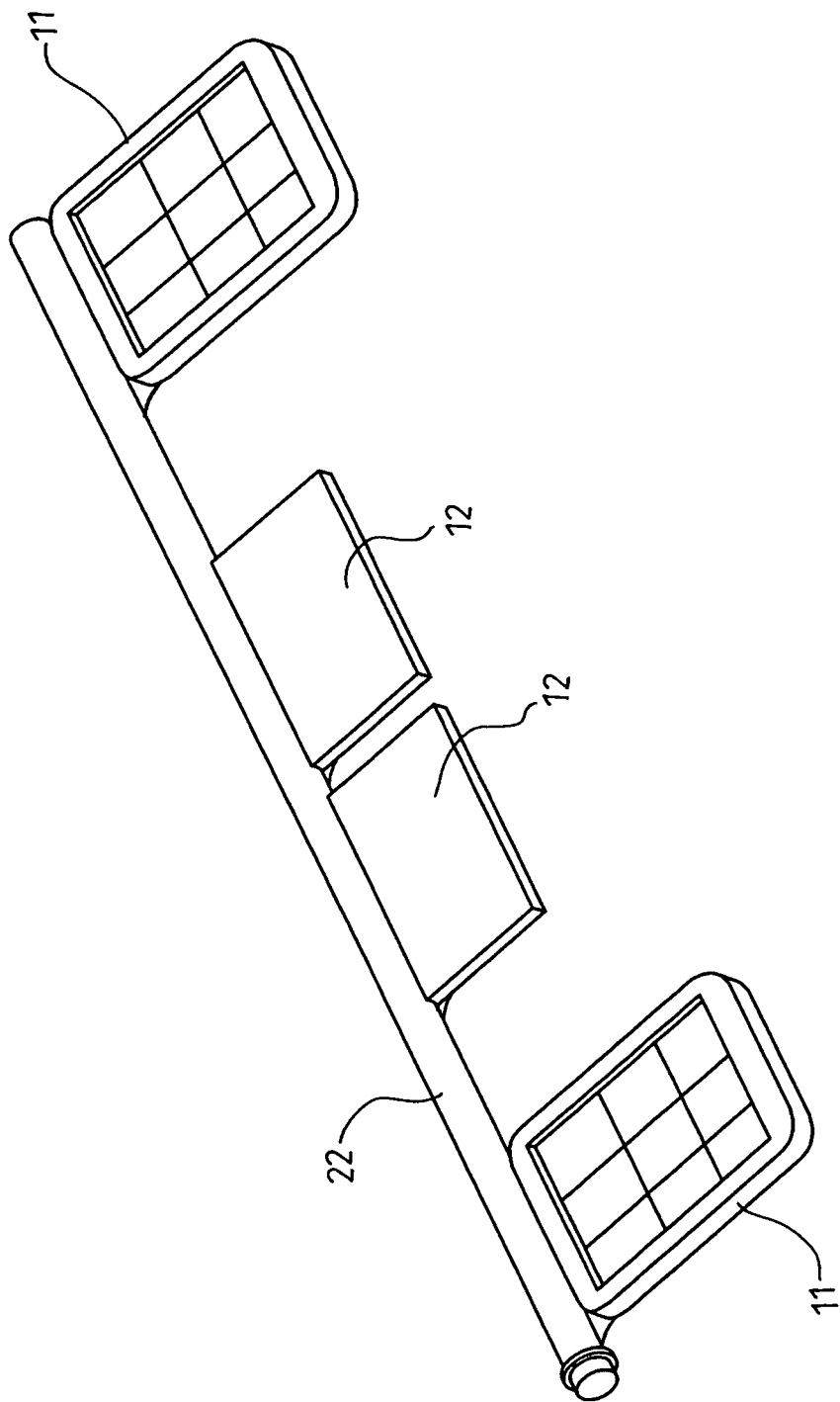
FIG. 3 is a perspective view of a door unit applied to the air conditioner unit 1 of the embodiment 1 and integrally provided with foot doors and air distribution amount adjustment blades.
Figure 4:
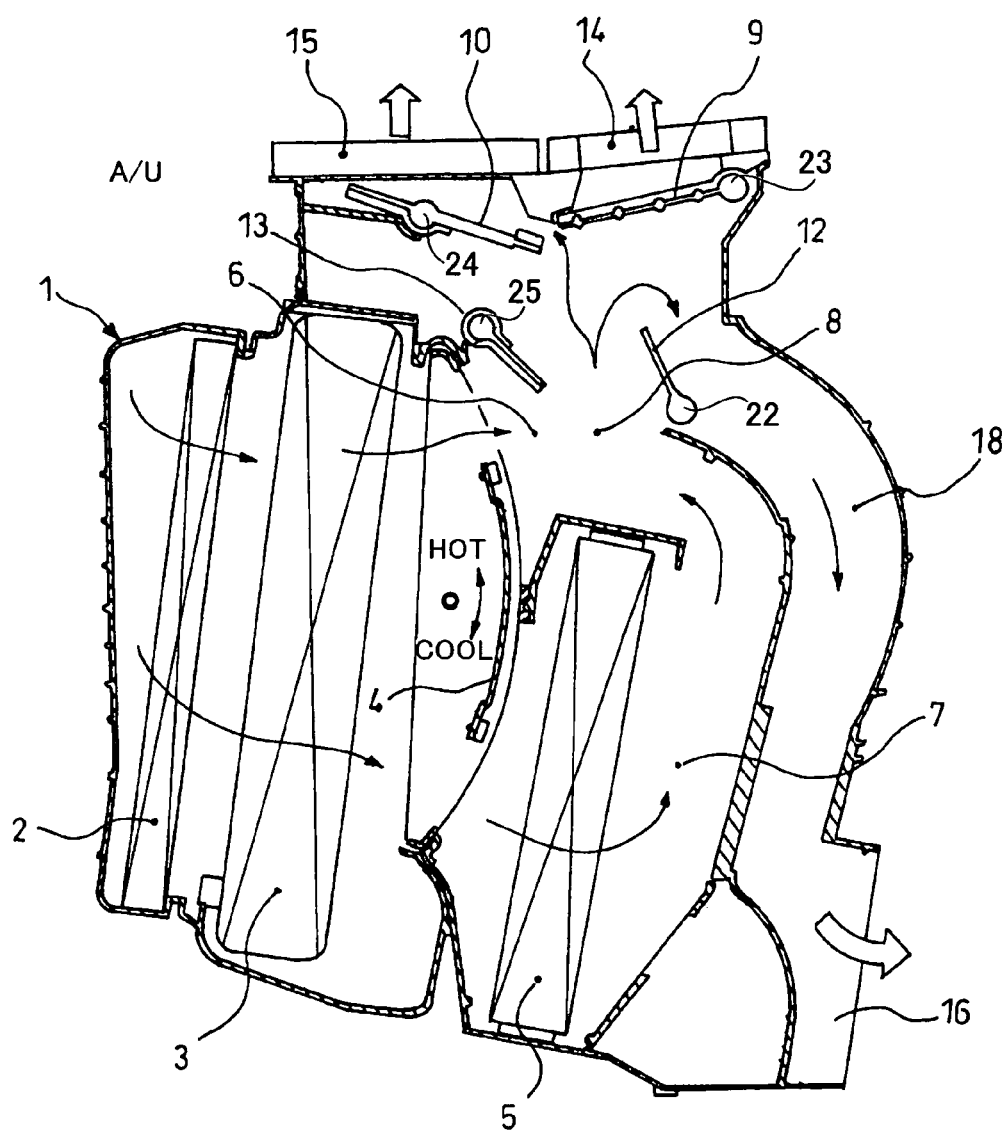
FIG. 4 is a vertical sectional view of the air conditioner unit A/U of the embodiment 1.

FIG. 1 is a general perspective view of the air conditioner unit A/U (an example of the air conditioner for the vehicle) of an embodiment 1. FIG. 2 is a plan view of the air conditioner unit A/U of the embodiment 1. FIG. 3 is a perspective view of a door unit applied the air conditioner unit A/U of the embodiment 1 and integrally provided with foot doors and air distribution amount adjustment blades. FIG. 4 is a vertical sectional view of the air conditioner unit A/U of the embodiment 1.

The air conditioner unit A/U in the embodiment 1 includes, as shown in FIG. 4, an air conditioner casing 1, a clean filter 2, an evaporator 3 (heat exchanger for cooling), an air mix door 4, a heater core 5 (heat exchanger for heating), a cold air bypass path 6, a hot air path 7, an air mix chamber 8, front vent doors 9, defroster doors 10, foot doors 11 (see FIG. 3), air distribution amount adjustment blades 12, a temperature adjustment blade 13, front vent outlets 14, defroster outlets 15, rear vent outlets 16, and foot outlets 17 (see FIG. 1).

In the air conditioner unit A/U in the embodiment 1, the evaporator 3, the air mix door 4, and the heater core 5 are arranged in the air conditioner casing 1 in that order from an upstream fan (not shown) side toward a downstream outlet side.

The evaporator 3 is a heat exchanger for cooling inside air or outside air passing through the fan (outside the drawings) and the clean filter 2. The evaporator 3 is a component part of a refrigeration cycle for circulating a refrigerant and has a refrigerant inlet and a refrigerant outlet.

The air mix door 4 is disposed in a downstream position of the evaporator 3 and controls, with its door opening degree, a mixture ratio of cold air via the evaporator 3 and hot air via the heater core 5. In the embodiment 1, a sliding door is employed as the air mix door 4. When the door is positioned at an upper end in FIG. 4, it is full hot. When the door is positioned at a lower end in FIG. 4, it is full cool. If the door is controlled to be at any midpoint between the upper end and the lower end, the mixture ratio of the cold air and the hot air is changed.

The heater core 5 is a heat exchanger disposed in a downstream position of the evaporator 3 and the air mix door 4 to heat air passing through it. Engine cooling water is introduced into the heater core 5 and the heater core 5 has an engine cooling water inlet and an engine cooling water outlet.

The air conditioner unit A/U in the embodiment 1 has rear vent outlet paths 18 and foot outlet paths 19 (see FIGS. 5A to 8C) branching out via the air mix chamber 8 for mixing the cold air and the hot air. The rear vent outlet paths 18 are provided with air distribution amount adjustment blades 12 for adjusting air distribution amounts from the air mix chamber 8 as shown in FIG. 4. The foot outlet paths 19 are provided with the foot doors 11 door opening degrees of which are controlled according to a selected mode as shown in FIGS. 5A to 8C. The air distribution amount adjustment blades 12 are blades in operative association with open/close operation of the foot doors 11. When the door opening degrees of the foot doors 11 are large, amounts of air distribution to the rear vent outlet paths 18 are limited.

The door opening degrees of the foot doors 11 are adjusted by controlling turning of a door turning shaft 22 by a door actuator 21 provided with a door link mechanism 20 interposed therebetween as shown in FIG. 2. The air distribution amount adjustment blades 12 are integrally connected to the foot doors 11 using the door turning shaft 22 as a blade operating shaft as shown in FIG. 3. In the embodiment 1, a pair of foot doors 11 is provided at opposite end portions of the door turning shaft 22 for left and right front seats and a pair of air distribution amount adjustment blades 12 is provided at a central portion of the door turning shaft 22 for left and right rear seats.

As shown in FIG. 4, the rear vent outlet paths 18 are paths having distributed air inlets in positions where vertical upward air from the air mix chamber 8 disposed in an upper position in the air conditioner casing 1 is changed into vertical forward air. The paths 18 extend from the distributed air inlets at a case upper portion toward a case lower portion in the air conditioner casing 1. The air distribution amount adjustment blades 12 are disposed at the distributed air inlets of the rear vent outlet paths 18 as shown in FIG. 4.

The foot outlet paths 19 are paths having distributed air inlets in left and right positions where vertical upward air from the air mix chamber 8 disposed in the upper position in the air conditioner casing 1 is changed into lateral air. The paths 19 extend from the distributed air inlets (a position of the section taken along the line A-A in FIG. 2) at side upper portions toward the case lower portion in the air conditioner casing 1. The foot doors 11 are disposed at the distributed air inlets of the foot outlet paths 19 as shown in FIGS. 5A to 8C.

The front vent doors 9 are disposed at the front vent outlets 14 open in positions where a direction of the vertical upward air from the air mix chamber 8 extends as shown in FIG. 4. Four groups of the front vent outlet 14 and the front vent door 9 are provided as shown in FIGS. 1 and 2. Front vent ducts outside the drawings are connected to the groups and communicate with two vent outlet grilles disposed at a central position of the front seats and two vent outlet grilles disposed at left and right positions of the front seats.

The defroster doors 10 are disposed at the defroster outlets 15 open in positions where the vertical upward air from the air mix chamber 8 is changed into vertical rearward air as shown in FIG. 4. Two groups of the defroster outlet 15 and the defroster door 10 are provided as shown in FIGS. 1 and 2. Defroster ducts outside the drawings are connected to the groups and communicate with defroster outlet grilles disposed inside a windshield.

The temperature adjustment blade 13 is disposed in a position facing the air distribution amount adjustment blades 12 and below the defroster doors 10 as shown in FIG. 4. The temperature adjustment blade 13 is provided to improve air mixing performance of the cold air and the hot air in the air mix chamber 8, i.e., to secure uniformity of temperature of the sent-out temperature-adjusted air.

The air distribution amount adjustment blades 12 are disposed in positions below the front vent doors 9 as shown in FIG. 4. In other words, the air distribution amount adjustment blades 12 and the temperature adjustment blade 13 are disposed to face each other in the position of the air mix chamber 8 and the front vent doors 9 and the defroster doors 10 are disposed in positions above both the blades 12, 13, respectively.

Next, operation will be described.

Operation when each of a vent mode, a bi-level mode, a first defroster/foot mode, and a second defroster/foot mode that are switching modes of the outlets is selected will be described below.

[When the Vent Mode is Selected]

Figure 5A:
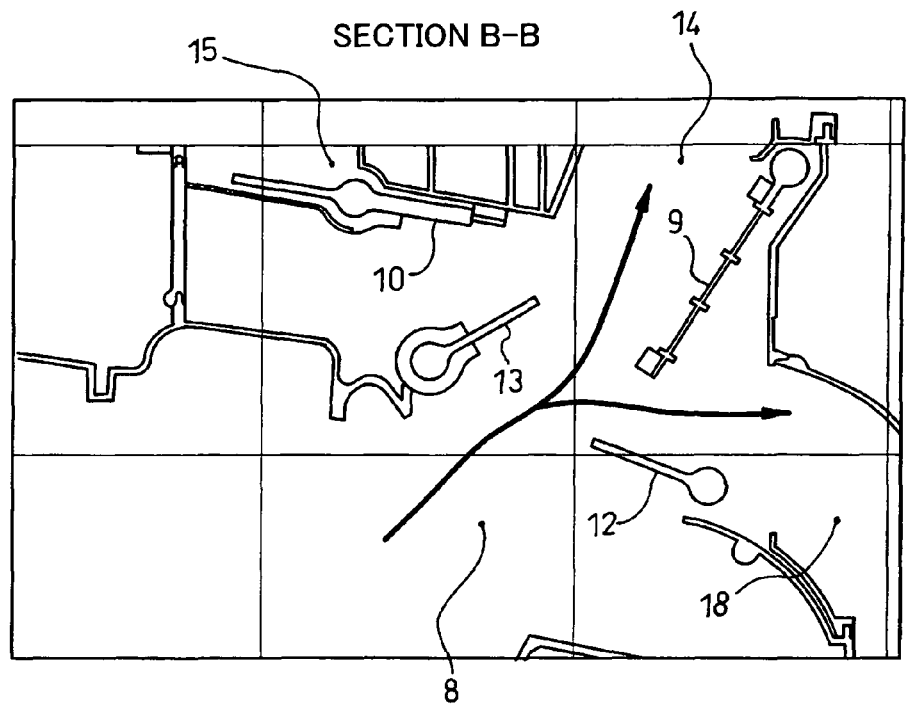
FIG. 5A is a sectional view taken along a line B-B in FIG. 2 when a vent mode is selected and showing settings of respective doors and respective blades when the vent mode is selected.
Figure 5B:
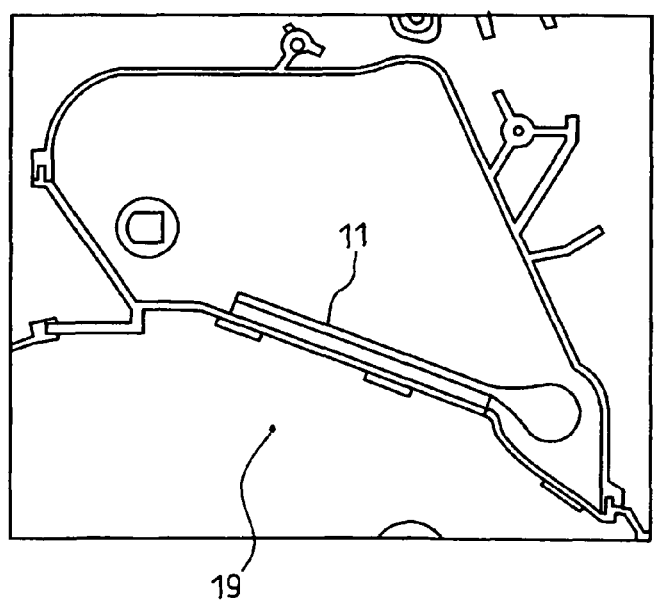
FIG. 5B is a sectional view taken along a line A-A in FIG. 2 when the vent mode is selected and showing settings of the respective doors and the respective blades when the vent mode is selected.

FIG. 5A is a sectional view taken along a line B-B in FIG. 2 when the vent mode is selected and showing settings of the respective doors and the respective blades when the vent mode is selected. FIG. 5B is a sectional view taken along a line A-A in FIG. 2 when the vent mode is selected and showing settings of the respective doors and the respective blades when the vent mode is selected.

When the vent mode is selected, as shown in FIGS. 5A and 5B, the front vent doors 9 are fully open and the defroster doors 10 and the foot doors 11 are fully closed. When the vent mode is selected, as shown in FIG. 5A, the temperature adjustment blade 13 is in such a blade position as to direct a flow of air from the air mix chamber 8 toward the front vent outlets 14 and the air distribution amount adjustment blades 12 are in such blade positions as to fully open the distributed air inlets of the rear vent outlet paths 18.

Therefore, when the vent mode for mainly sending cold air toward faces of occupants is selected, the temperature adjustment blade 13 takes charge of air supply guiding operation for guiding air from the air mix chamber 8 to the front vent outlets 14 to secure air distribution amounts to a driver in the front seat and an occupant in a passenger seat. At the same time, the air distribution amount adjustment blades 12 fully open the distributed air inlets of the rear vent outlet paths 18 to guide air from the air mix chamber 8 to the rear vent outlet paths 18 with minimum path resistances to thereby secure air distribution amounts to occupants in the rear seats.

Moreover, when the air distribution amount adjustment blades 12 are in such positions as to fully open the distributed air inlets of the rear vent outlet paths 18, the air distribution amount adjustment blades 12 receive part of air from the air mix chamber 8 and return it to the upstream side to facilitate mixture of the cold air and the hot air in the area of the air mix chamber 8. In this way, the air mixing performance is improved.

[When the Bi-Level Mode is Selected]

Figure 6A:
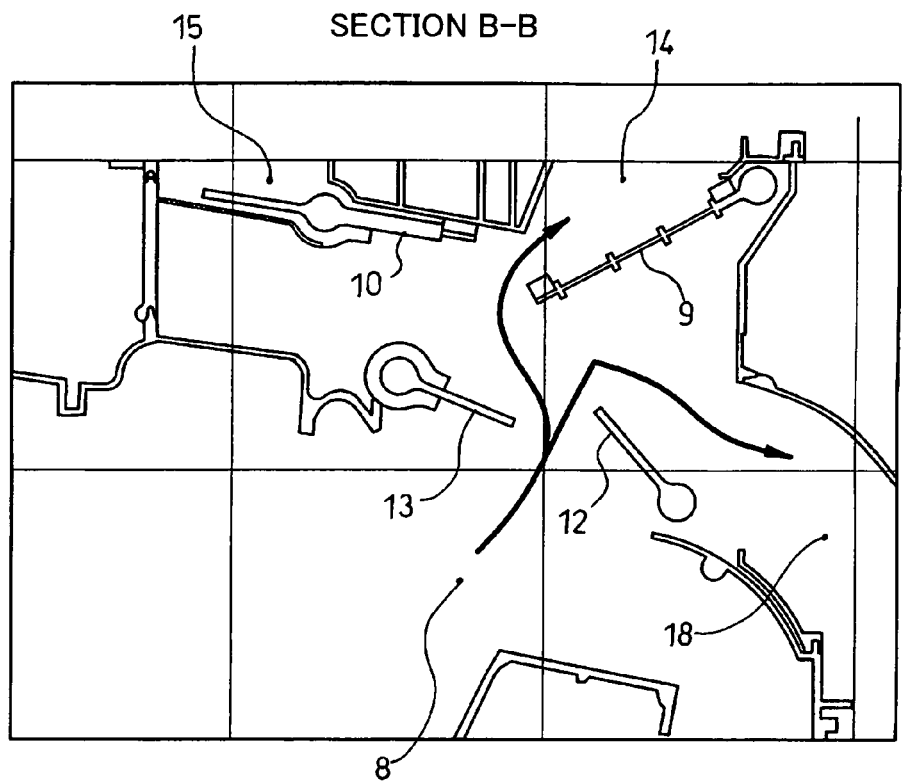
FIG. 6A is a sectional view taken along the line B-B in FIG. 2 when a bi-level mode is selected and showing settings of the respective doors and the respective blades when the bi-level mode is selected.

FIG. 6A is a sectional view taken along the line B-B in FIG. 2 when the bi-level mode is selected and showing settings of the respective doors and the respective blades when the bi-level mode is selected. FIG. 5B is a sectional view taken along the line A-A in FIG. 2 when the bi-level mode is selected and showing settings of the respective doors and the respective blades when the bi-level mode is selected.

Figure 6B:
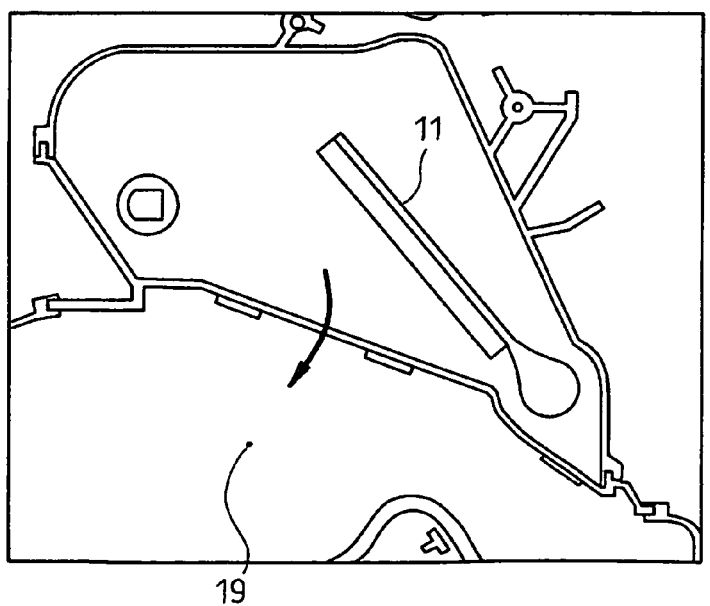
FIG. 6B is a sectional view taken along the line A-A in FIG. 2 when the bi-level mode is selected and showing settings of the respective doors and the respective blades when the bi-level mode is selected.

When the bi-level mode is selected, as shown in FIGS. 6A and 6B, the front vent doors 9 and the foot doors 11 are half open and the defroster doors 10 are fully closed. When the bi-level mode is selected, as shown in FIG. 6A, the temperature adjustment blade 13 is in such a blade position as to be orthogonal to the flow of air from the air mix chamber 8 and the air distribution amount adjustment blades 12 are in such blade positions as to half open the distributed air inlets of the rear vent outlet paths 18.

Therefore, when the bi-level mode for sending air from the air mix chamber 8 out through the three kinds of outlets (the front vent outlets 14, the rear vent outlets 16, and the foot outlets 17) is selected, if the air distribution amounts to the front vent outlets 14 and the rear vent outlets 16 are not limited, the air distribution amounts to the foot outlets 17 with the highest path resistances become insufficient. In other words, most of the air from the air mix chamber 8 is consumed as the air distribution amounts to the front vent outlets 14 with the lowest path resistances and the rear vent outlets 16 with the second-lowest path resistances.

On the other hand, in the embodiment 1, when the bi-level mode is selected, the temperature adjustment blade 13 performs operation of limiting and adjusting the air distribution amounts to the front vent outlets 14 and the air distribution amount adjustment blades 12 perform operations of limiting and adjusting the air distribution amounts to the rear vent outlet paths 18 and the rear vent outlets 16.

As described above, when the bi-level mode is selected, it is possible to relatively secure the air distribution amounts to the foot outlets 17 by limiting the air distribution amounts to the front vent outlets 14 and the rear vent outlets 16.

Moreover, if the temperature adjustment blade 13 is in such a position as to be orthogonal to the flow of air from the air mix chamber 8, the temperature adjustment blade 13 receives part of the air from the air mix chamber 8 and returns it to the upstream side to facilitate mixture of the cold air and the hot air in the area of the air mix chamber 8. In this way, the air mixing performance is improved.

[When the First Defroster/Foot Mode is Selected]

Figure 7A:
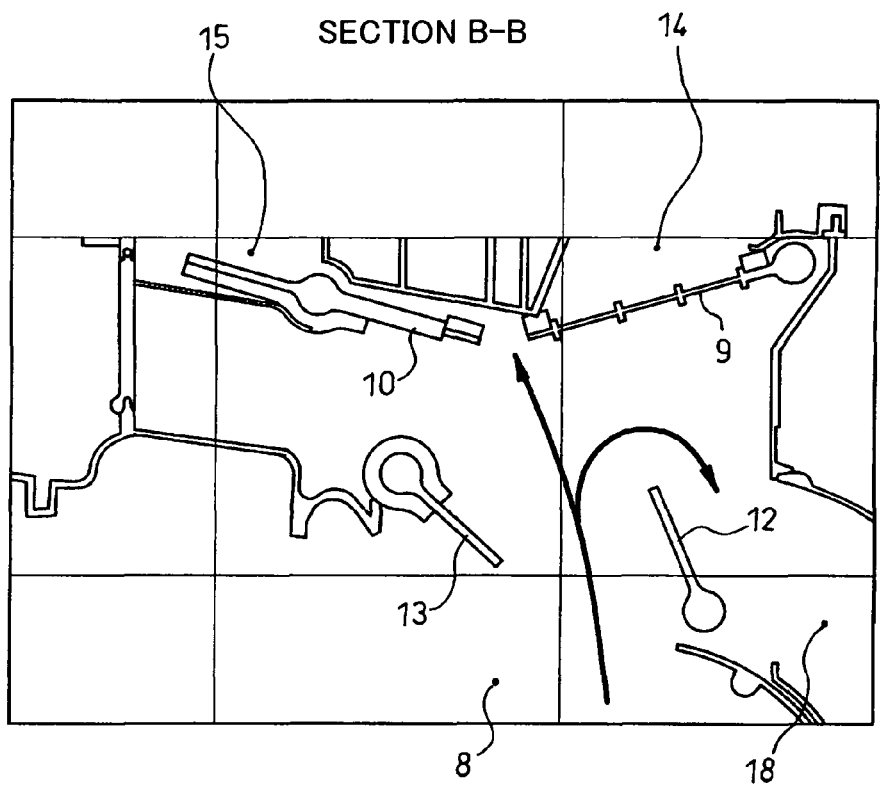
FIG. 7A is a sectional view taken along the line B-B in FIG. 2 when a first defroster/foot mode is selected and showing settings of the respective doors and the respective blades when the first defroster/foot mode is selected.
Figure 7B:
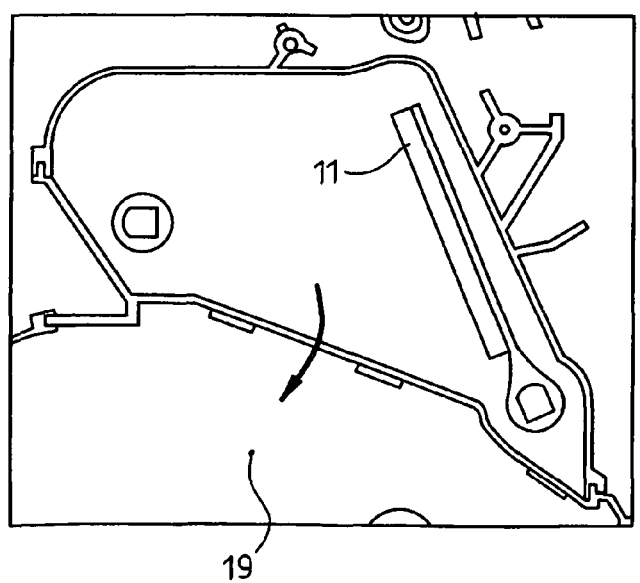
FIG. 7B is a sectional view taken along the line A-A in FIG. 2 when the first defroster/foot mode is selected and showing settings of the respective doors and the respective blades when the first defroster/foot mode is selected.

FIG. 7A is a sectional view taken along the line B-B in FIG. 2 when the first defroster/foot mode is selected and showing settings of the respective doors and the respective blades when the first defroster/foot mode is selected. FIG. 7B is a sectional view taken along the line A-A in FIG. 2 when the first defroster/foot mode is selected and showing settings of the respective doors and the respective blades when the first defroster/foot mode is selected.

When the first defroster/foot mode is selected, as shown in FIGS. 7A and 7B, the front vent doors 9 are fully closed, the defroster doors 10 are slightly open, and the foot doors 11 are fully open. When the first defroster/foot mode is selected, as shown in FIG. 7A, the temperature adjustment blade 13 is in such a blade position as to direct the flow of air from the air mix chamber 8 toward the defroster outlets 15 and the air distribution amount adjustment blades 12 are set in such blade positions as to limit the distributed air inlets of the rear vent outlet paths 18 to a minimum.

Therefore, if the first defroster/foot mode for sending the air (mainly hot air) from the air mix chamber 8 out through the three kinds of outlets (the defroster outlets 15, the rear vent outlets 16, and the foot outlets 17) is selected when the wind shield is a little likely to fog, the air distribution amounts to the defroster outlets 15 are limited by the opening degrees of the defroster doors 10. However, if the air distribution amounts to the rear vent outlets 16 are not limited, the air distribution amounts to the foot outlets 17 with the highest path resistances become insufficient. In other words, most of the air from the air mix chamber 8 and excluding the defroster air distribution amounts is consumed as the air distribution amounts to the rear vent outlets 16 with the lower path resistances than the foot outlets 17.

On the other hand, in the embodiment 1, when the first defroster/foot mode is selected, the temperature adjustment blade 13 performs operation of guiding the distributed air to the defroster outlets 15 and the air distribution amount adjustment blades 12 perform operations of limiting and adjusting the air distribution amounts to the rear vent outlet paths 18 and the rear vent outlets 16.

As described above, when the first defroster/foot mode for limiting the air distribution amounts to the defroster outlets 15 by the opening degrees of the defroster doors 10 is selected, it is possible to relatively secure the air distribution amounts to the foot outlets 17 by limiting the air distribution amounts to the rear vent outlets 16.

[When the Second Defroster/Foot Mode is Selected]

Figure 8A:
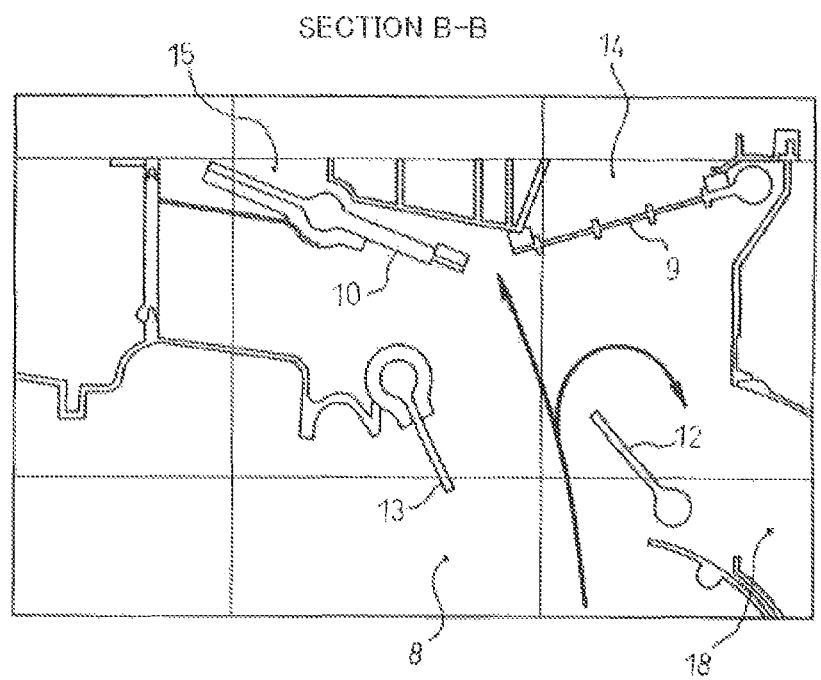
FIG. 8A is a sectional view taken along the line B-B in FIG. 2 when a second defroster/foot mode is selected and showing settings of the respective doors and the respective blades when the second defroster/foot mode is selected.
Figure 8B:
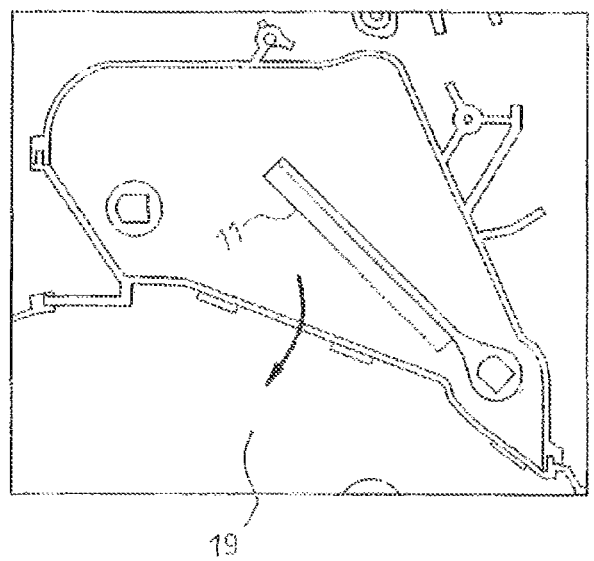
FIG. 8B is a sectional view taken along the line A-A in FIG. 2 when the second defroster/foot mode is selected and showing settings of the respective doors and the respective blades when the second defroster/foot mode is selected.

FIG. 8A is a sectional view taken along the line B-B in FIG. 2 when the second defroster/foot mode is selected and showing settings of the respective doors and the respective blades when the second defroster/foot mode is selected. FIG. 8B is a sectional view taken along the line A-A in FIG. 2 when the second defroster/foot mode is selected and showing settings of the respective doors and the respective blades when the second defroster/foot mode is selected.

When the second defroster/foot mode is selected, as shown in FIGS. 8A and 8B, the front vent doors 9 are fully closed, the defroster doors 10 are half open, and the foot doors 11 are half open. When the second defroster/foot mode is selected, as shown in FIG. 8A, the temperature adjustment blade 13 is set in such a blade position as to direct the flow of air from the air mix chamber 8 toward the defroster outlets 15 and the air distribution amount adjustment blades 12 are set in such blade positions as to half open the distributed air inlets of the rear vent outlet paths 18.

Therefore, if the second defroster/foot mode is selected when the wind shield is more likely to fog than when the first defroster/foot mode is selected to send the air (mainly hot air) from the air mix chamber 8 out through the three kinds of outlets (the defroster outlets 15, the rear vent outlets 16, and the foot outlets 17) is selected, the air distribution amounts to the defroster outlets 15 are secured by half opening the defroster doors 10. At this time, if the air distribution amounts to the rear vent outlets 16 are not limited, the air distribution amounts to the foot outlets 17 with the highest path resistances become insufficient. In other words, most of the air from the air mix chamber 8 and excluding the defroster air distribution amounts is consumed as the air distribution amounts to the rear vent outlets 16 with the lower path resistances than the foot outlets 17.

On the other hand, in the embodiment 1, when the second defroster/foot mode is selected, the temperature adjustment blade 13 performs operation of guiding the distributed air to the defroster outlets 15 and the air distribution amount adjustment blades 12 perform operations of limiting and adjusting the air distribution amounts to the rear vent outlet paths 18 and the rear vent outlets 16.

As described above, when the second defroster/foot mode for half opening the defroster doors 10 to thereby secure the air distribution amounts to the defroster outlets 15 is selected, it is possible to relatively secure the air distribution amounts to the foot outlets 17 by limiting the air distribution amounts to the rear vent outlets 16.

[Rear Vent Outlet Air Distribution Amount Adjusting Operation]

In the air conditioner unit A/U in the embodiment 1, the air distribution amount adjustment blades 12 are blades in operative association with open/close operation of the foot doors 10. Therefore, it is unnecessary to provide special door links to the rear vent doors and the foot doors, respectively, as in the prior art, which reduces the cost, improves the space-saving property, and makes the unit compact.

Especially if the air distribution amount adjustment blades 12 are provided integrally with the foot doors 11 while using the door turning shaft 22 as a blade operating shaft as shown in FIG. 3 as in the embodiment 1, the simple structure in which the air distribution amount adjustment blades 12 are simply provided to the door turning shaft 22 suffices, which does not require additional space and minimizes the cost.

In the air conditioner unit A/U in the embodiment 1, when the opening degrees of the foot doors 10 are large, the air distribution amount adjustment blades 12 limit the air distribution amounts to the rear vent outlet paths 18. Therefore, it is possible to prevent the foot outlet air distribution amounts from becoming insufficient when the bi-level mode, the first defroster/foot mode, or the second defroster/foot mode for carrying out both the foot outlet air distribution and rear vent outlet air distribution is selected.

In other words, if the unit includes the rear vent outlet paths 18 and the foot outlet paths 19 branching out via the air mix chamber 8 in the air conditioner casing 1, the path resistances are higher in the foot outlet paths 19 curved in complicated manners than in the rear vent outlet paths 18 curved in simple manners. Therefore, even if the foot doors 11 are fully open, amounts of air distribution to the rear vent outlet paths 18 having the lower path resistance become greater. As a result, foot outlet air distribution amounts relatively become insufficient.

On the other hand, in the embodiment 1, by employing the air distribution amount adjustment blades 12 in operative association with the foot doors 11, coordinated control of the path resistances is carried out mechanically to maintain proper relationships between the foot outlet air distribution amounts and the rear vent outlet distribution amounts when the bi-level mode is selected, the first defroster/foot mode is selected, and the second defroster/foot mode is selected.

Next, effects will be described. With the air conditioner unit A/U in the embodiment 1, the effects listed below can be obtained.

(1) In the air conditioner unit A/U including the evaporator 3, the air mix door 4, and the heater core 5 arranged in the air conditioner casing 1 in that order from the upstream fan side toward the downstream side and the rear vent outlet paths 18 and the foot outlet paths 19 branching out via the air mix chamber 8 for mixing cold air and hot air, the air distribution amount adjustment blades 12 for adjusting the amounts of air distribution from the air mix chamber 8 are provided in the rear vent outlet paths 18, the foot doors 11 the door opening degrees of which are controlled according to the selected mode are provided in the foot outlet paths 19, and the air distribution amount adjustment blades 12 are the blades in operative association with the door open/close operation of the foot doors 11 and for limiting the amounts of air distribution to the rear vent outlet paths 18 when the door opening degrees of the foot doors 11 are large. Therefore, the air conditioner unit is advantageous in cost and space-saving property and can adjust the foot outlet air distribution amounts to proper and sufficient amounts when the mode for carrying out the foot outlet air distribution and the rear vent outlet air distribution is selected.

(2) The door opening degrees of the foot doors 11 are adjusted by controlling turning of the door turning shaft 22 with the door actuator 21 provided with the door link mechanism 20 interposed therebetween and the air distribution amount adjustment blades 12 use the door turning shaft 22 as the blade operating shaft and are integrally provided with the foot doors 11. Therefore, the simple structure in which the air distribution amount adjustment blades 12 are simply provided to the door turning shaft 22 suffices, which does not require additional space and minimizes the cost.

(3) The rear vent outlet paths 18 are the paths having distributed air inlets disposed in the positions where the vertical upward air from the air mix chamber 8 disposed in the upper position in the air conditioner casing 1 into the vertical forward air, the paths 18 extending from the distributed air inlets at the upper portion of the air conditioner casing 1 toward the casing lower portion. The air distribution amount adjustment blades 12 are set in the positions of the distributed air inlets in the rear vent outlet paths 18. The foot outlet paths 19 are the paths having the distributed air inlets disposed in the positions where the vertical upward air from the air mix chamber 8 disposed in the upper position in the air conditioner casing 1 into the lateral air, the paths 19 extending from the distributed air inlets at the upper side portion of the air conditioner casing 1 toward the casing lower portion. The foot doors 11 are set in the positions of the distributed air inlets in the foot outlet paths 19. Therefore, in spite of the structure having a large difference between path resistances in the rear vent outlet paths 18 and the foot outlet paths 19, it is possible to control the path resistances to maintain a proper relationship between the foot outlet air distribution amounts and the rear vent outlet air distribution amounts by the air distribution amount adjustment blades 12 set in the positions of the distributed air inlets in the rear vent outlet paths 18.

(4) The front vent doors 9 are set in the front vent outlets 14 open in the positions on an extension line of a direction of the vertical upward air from the air mix chamber 8. The defroster doors 10 are set in the defroster outlets 15 open in the positions where the vertical upward air from the air mix chamber 8 is changed into vertical rearward air. The temperature adjustment blade 13 is set in the position facing the air distribution amount adjustment blades 12 and below the defroster doors 10. The air distribution amount adjustment blades 12 are set below the front vent doors 9. Therefore, with the two kinds of blades 12, 13 disposed near two kinds of doors 9, 10, it is possible to obtain an air distribution amount adjustment function and a temperature adjustment function for the four kinds of outlets 14, 15, 16, and 17.

(5) When the vent mode in which the front vent doors 9 are fully open and the defroster doors 10 and the foot doors 11 are fully closed is selected, the temperature adjustment blade 13 is set in such a blade position as to direct the flow of air from the air mix chamber 8 toward the front vent outlets 14 and the air distribution amount adjustment blade 12 are set in such blade positions as to fully open the distributed air inlets of the rear vent outlet paths 18. Therefore, it is possible to maintain proper vent air distribution amounts to the front seats and vent air distribution amounts to the rear seats. It is also possible to enhance air mixing performance by the fully opening setting by the air distribution amount adjustment blades 12.

(6) When the bi-level mode in which the front vent doors 9 and the foot doors 11 are half open and the defroster doors 10 are fully closed is selected, the temperature adjustment blade 13 is set in such a blade position as to be orthogonal to the flow of air from the air mix chamber 8 and the air distribution amount adjustment blades 12 are set in such blade positions as to half open the distributed air inlets of the rear vent outlet paths 18. When the first defroster/foot mode in which the front vent doors 9 are fully closed, the defroster doors 10 are slightly open, and the foot doors 11 are fully open is selected, the temperature adjustment blade 13 is set in such a blade position as to direct the flow of air from the air mix chamber 8 toward the defroster outlets 15 and the air distribution amount adjustment blades 12 are set in such blade positions as to limit the distributed air inlets of the rear vent outlet paths 18 to a minimum. When the second defroster/foot mode in which the front vent doors 9 are fully closed, the defroster doors 10 are half open, and the foot doors 11 are half open is selected, the temperature adjustment blade 13 is set in such a blade position as to direct the flow of air from the air mix chamber 8 toward the defroster outlets 15 and the air distribution amount adjustment blades 12 are set in such blade positions as to half open the distributed air inlets of the rear vent outlet paths 18. Therefore, it is possible to adjust the foot outlet air distribution amounts to proper values when each of the bi-level mode, the first defroster/foot mode, and the second defroster/foot mode for carrying out both the foot outlet air distribution and rear vent outlet air distribution is selected.

Although the air conditioner for the vehicle according to the invention has been described above based on the embodiment 1, specific structures are not limited to those in the embodiment 1 and changes in and additions to the design are allowed without departing from the gist of the invention according to respective claims.

Although the air distribution amount adjustment blades 12 are integrally provided with the foot doors 11 while using the door turning shaft 22 as the blade operating shaft in the embodiment 1, the door turning shaft and the blade operating shaft may be disposed in different positions from each other and an interlocking mechanism may be provided between both the shafts. In short, the air distribution amount adjustment blades 12 are not limited to the structures in the embodiment 1 if they are blades in operative association with door open/close operation of the foot doors 11.

Embodiment 2

First, a structure will be described. Because the structures shown in FIGS. 1 to 4 are similar to those in the embodiment 1, description of them will be omitted.

Figure 9:
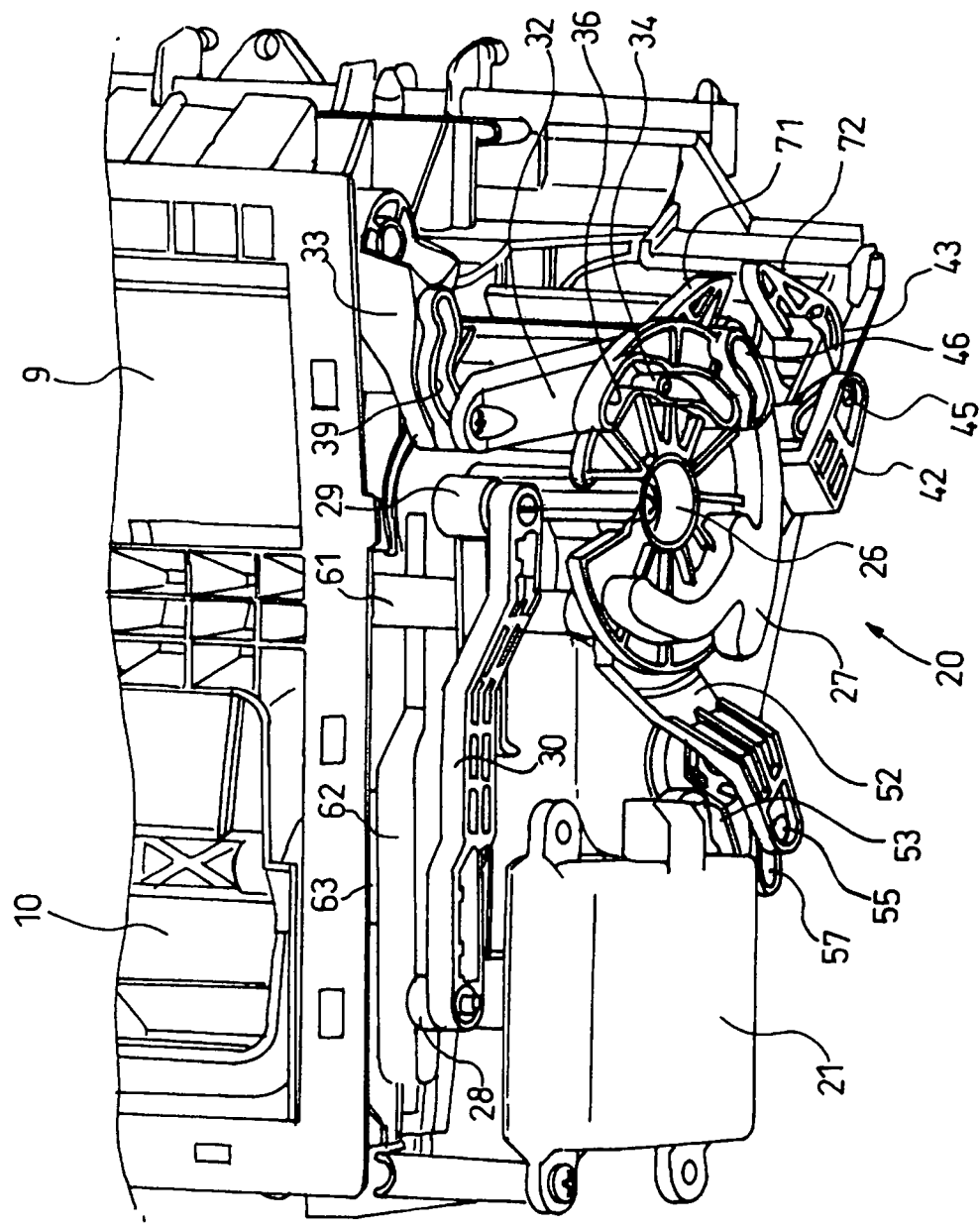
FIG. 9 is a perspective view of a door link mechanism 20 applied to an air conditioner unit A/U of an embodiment 2.
Figure 10:
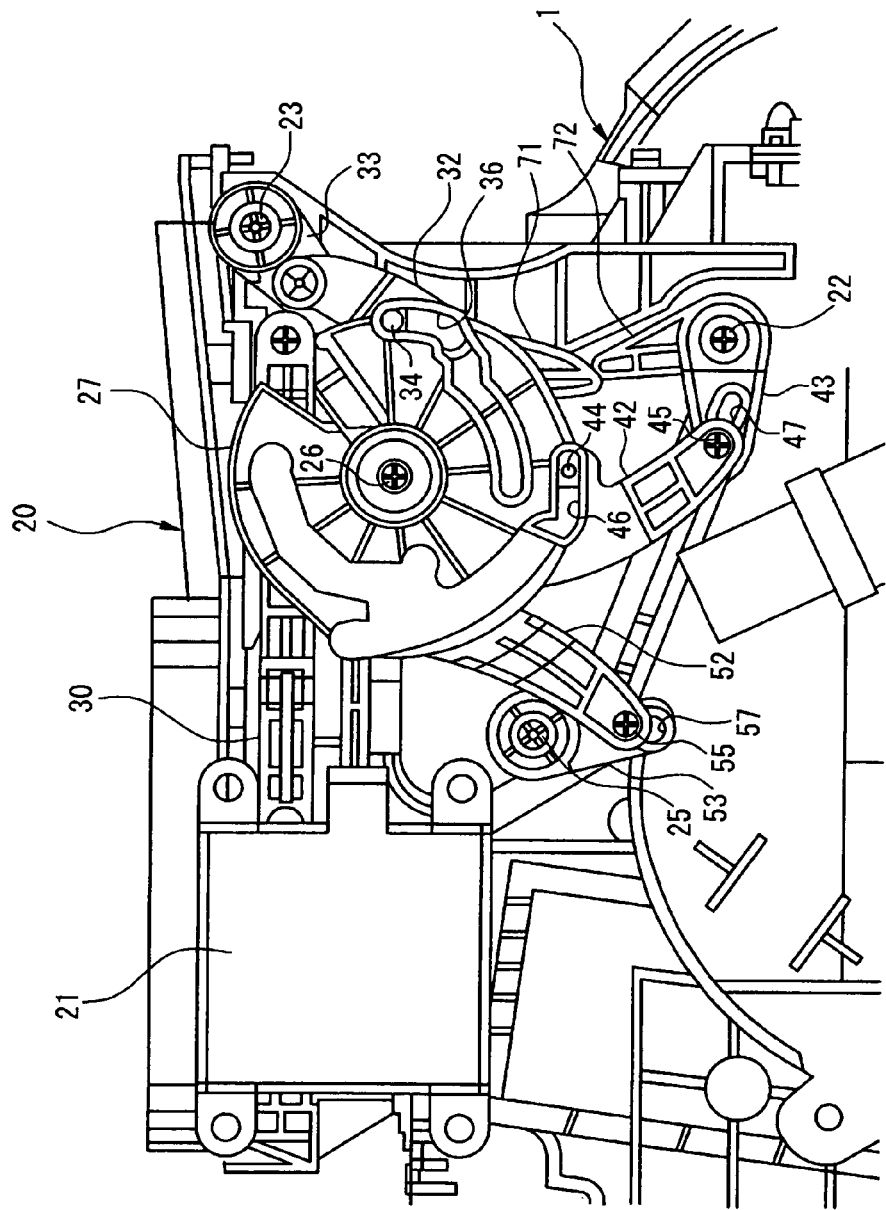
FIG. 10 is a front view of the door link mechanism 20 applied to the air conditioner unit A/U of the embodiment 2.
Figure 11:
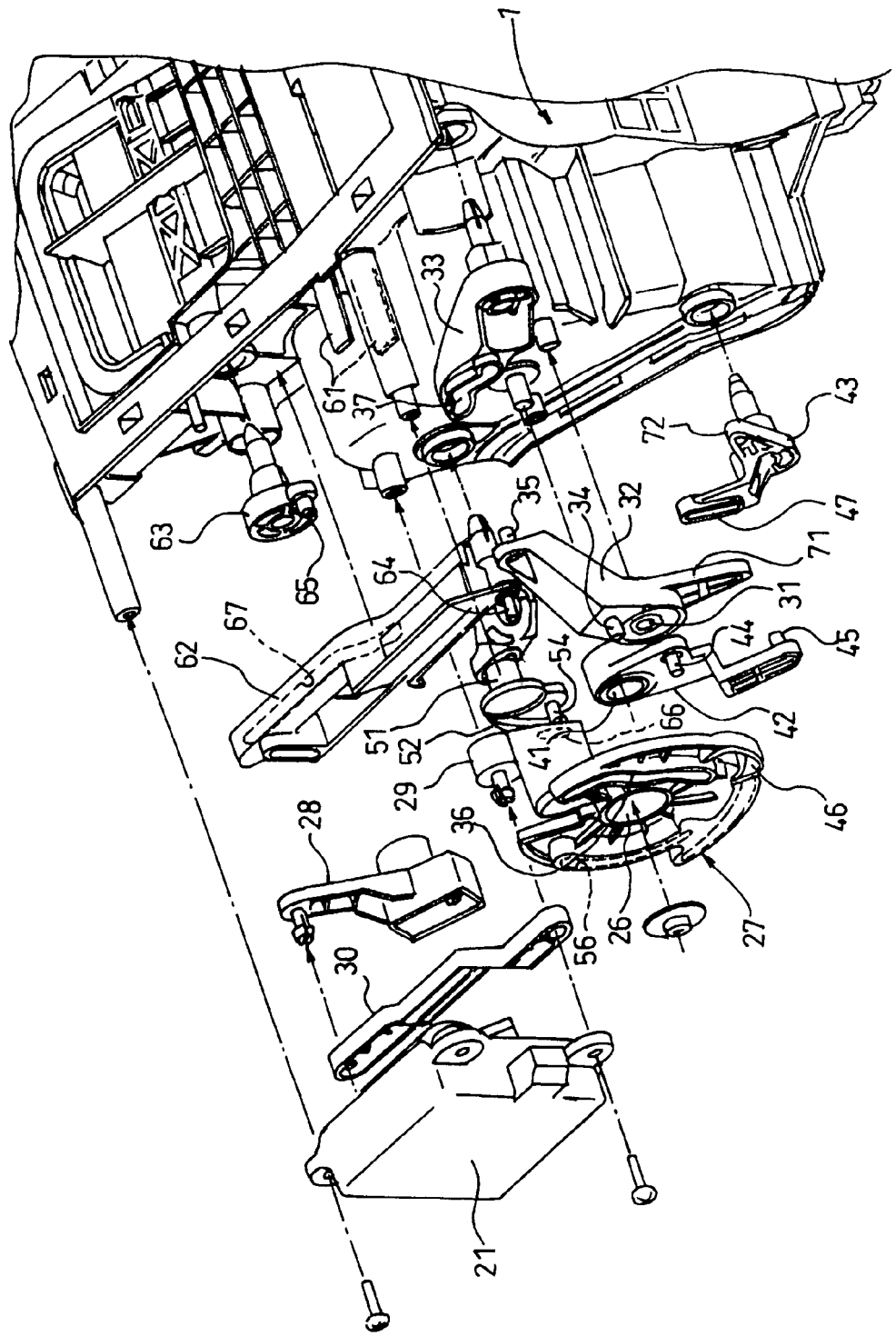
FIG. 11 is an exploded perspective view of the door link mechanism 20 applied to the air conditioner unit A/U of the embodiment 2.

FIG. 9 is a perspective view of a door link mechanism 20 applied to an air conditioner unit A/U of the embodiment 2. FIG. 10 is a front view of the door link mechanism 20 applied to the air conditioner unit A/U of the embodiment 2. FIG. 11 is an exploded perspective view of the door link mechanism 20 applied to the air conditioner unit A/U of the embodiment 2.

The door link mechanism 20 for controlling operations of the front vent doors 9, the defroster doors 10, the foot doors 11 (=the air distribution amount adjustment blades 12), and the temperature adjustment blade 13 in the air conditioner casing 1 according to the selected outlet switching mode is collectively disposed in an upper position on one side face in a vehicle width direction of the air conditioner casing 1 as shown in FIG. 2.

The door link mechanism 20 is a mechanism disposed among one door actuator 21, a foot door shaft 22, a vent door shaft 23, a defroster door shaft 24, and a temperature adjustment door shaft 25 and a structure of the door link mechanism 20 will be described based on FIGS. 9 to 11.

The door link mechanism 20 has, as a common structure, a main link 27 that is turned about a main link shaft 26 by the door actuator 21. Disposed between the door actuator 21 and the main link 27 is a parallel link mechanism formed of an actuator lever 28 provided to the door actuator 21, a link lever 29 integrally provided to the main link 27, and a link rod 30 for coupling the actuator lever 28 and the link lever 29.

A vent door link mechanism of the door link mechanism 20 includes a vent door link 32 for turning about a vent door link shaft 31 and a vent door lever 33 for turning about the vent door shaft 23. Out of a first pin 34 and a second pin 35 provided to the vent door link 32, the first pin 34 is engaged in a vent door link cam groove 36 formed in the main link 27 and the second pin 35 is engaged in a vent door lever cam groove 37 formed in the vent door lever 33.

A foot door link mechanism of the door link mechanism 20 includes a foot door link 42 for turning about a foot door link shaft 41 and a foot door lever 43 for turning about the foot door shaft 22. Out of a first pin 44 and a second pin 45 provided to the foot door link 42, the first pin 44 is engaged in a foot door link cam groove 46 formed in the main link 27 and the second pin 45 is engaged in a foot door lever cam groove 47 formed in the foot door lever 43.

A temperature adjustment door link mechanism of the door link mechanism 20 includes a temperature adjustment door link 52 for turning about a temperature adjustment door link shaft 51, and a temperature adjustment door lever 53 for turning about the temperature adjustment door shaft 25. Out of a first pin 54 and a second pin 55 provided to the temperature adjustment door link 52, the first pin 54 is engaged in a temperature adjustment door link cam groove 56 formed in the main link 27 and the second pin 55 is engaged in a temperature adjustment door lever cam groove 57 formed in the temperature adjustment door lever 53.

A defroster door link mechanism of the door link mechanism 20 includes a defroster door slide link 62 slid by slide pinching chips 61, 61 and a defroster door lever 63 for turning about the defroster door shaft 24, a first pin 64 is provided to the defroster door slide link 62, and a second pin 65 is provided to the defroster door lever 63. Out of both the pins 64, 65, the first pin 64 is engaged in a defroster door slide link cam groove 66 formed in the link lever 29 and a second pin 65 is engaged in a defroster door lever cam groove 67 formed in the defroster door slide link 62.

Figure 15:
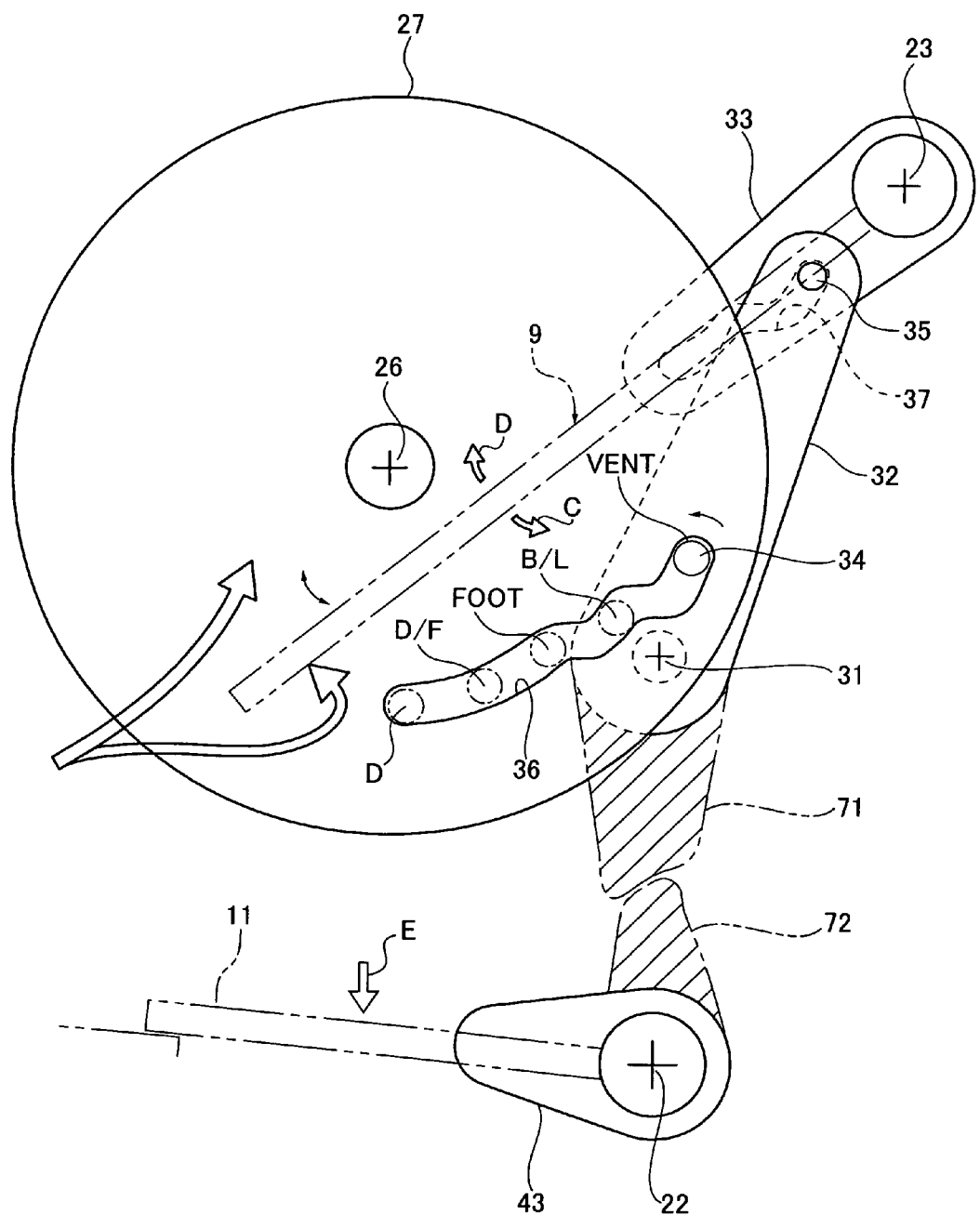
FIG. 15 is a drawing for explaining the vent door link retaining operation when the vent mode is selected.

As the outlet switching modes, there are a vent mode (first mode), a bi-level mode, a foot mode, a defroster/foot mode, and a defroster mode as basic modes (see FIG. 15). As variations of the basic modes, the vent mode may be divided into a first vent mode and a second vent mode and the defroster/foot mode may be divided into a first defroster/foot mode and a second defroster/foot mode, for example.

In the vent mode, the front vent doors 9 (first doors) are open and the defroster doors 10 and the foot doors 11 (second doors) are fully closed out of the front vent doors 9, the defroster doors 10, and the foot doors 11.

In the bi-level mode, the front vent doors 9 and the foot doors 11 are open and the defroster doors 10 are fully closed out of the front vent doors 9, the defroster doors 10, and the foot doors 11.

In the foot mode, the foot doors 11 are open and the defroster doors 10 and the front vent doors 9 are fully closed out of the front vent doors 9, the defroster doors 10, and the foot doors 11.

In the defroster/foot mode, the defroster doors 10 and the foot doors 11 are open and the front vent doors 9 are fully closed out of the front vent doors 9, the defroster doors 10, and the foot doors 11.

In the defroster mode, the defroster doors 10 are open and the front vent doors 9 and the foot doors 11 are fully closed out of the front vent doors 9, the defroster doors 10, and the foot doors 11.

In the second embodiment 2, provided between the vent door link 32 (first door link) for the front vent doors 9 and the foot door lever 43 (second door lever) for the foot doors 11 is a link retaining device for retaining a link position so that the vent door link 32 does not move from a prescribed position when the vent mode is selected and for canceling retention of the link position when another mode is selected.

The link retaining device is a device for canceling retention of the vent door link 32 while retracting to such a position as not to obstruct operation of the vent door link 32 in operative association with mode changing operation from the vent mode to another mode.

The link retaining device is formed of a vent door link extension portion 71 (first link extension portion) formed to extend from the vent door link 32 for the front vent doors 9 and a foot lever stopper portion 72 (second lever stopper portion) formed to extend from the foot door lever 43 for the foot doors 11.

The foot lever stopper portion 72 retains the vent door link extension portion 71 so that the vent door link 32 does not move in a door closing direction when the vent mode is selected. In operative association with mode changing operation from the vent mode to another mode such as the bi-level mode and the defroster/foot mode, the foot lever stopper portion 72 cancels retention of the vent door link 32 while retracting.

Next, operation will be described.

Described in the embodiment 2 of the invention is technique of the air conditioner for the vehicle in which the door link mechanism for controlling operations of the plurality of doors in the air conditioner casing according to the selected outlet switching mode is collectively disposed.

Conventionally, there is a known air conditioner for a vehicle in which a door link mechanism for controlling operations of a first mode door and a second mode door in an air conditioner casing according to a selected outlet changing mode is collectively disposed, the door link mechanism including a first door lever and a first door link on a first mode door shaft and a second door lever and a second door link on a second mode door shaft (see JP-A No. 9-20128, for example).

In the above prior-art air conditioner for the vehicle, however, coupling of the first door link and the first door lever, coupling of the second door link and the second door lever, and coupling of the first door link and the second door link are achieved by engagement of pins in cam grooves. The collectively disposed door link mechanism has an advantage in that one door actuator can control open/close operations of the plurality of mode doors. In this case, it is necessary to control operations, while changing a door opening degree of one mode door, to retain door opening degrees of the other mode doors.

Therefore, if force due to wind pressure acts on a door face when one of the first mode door and the second mode door is open, the door easily moves in an unrestricted turning direction due to backlash between the cam groove and the pin at a coupled portion to cause flaps of the doors which are undesirable in terms of sound vibration, though the door does not move in a turning direction in which link operation is restricted by engagement of the pin in the cam groove.

As a solution for the flap of the door, a washer (e.g., an urethane washer) for applying sliding resistance to sliding faces of the cam groove and the pin may be used in some cases. In this case, the sliding resistance is applied generally, which increases door actuating torque and requires a high-torque large door actuator. If the door actuating torque is insufficient, the pin may stop in a wrong position in reciprocation along the cam groove.

The embodiment 2 of the invention has been made with the above problems in view and it is an object of the embodiment 2 to provide a air conditioner for a vehicle that can retain the door opening degrees of the first doors when the first doors are open and the force due to wind pressure acts on door faces of the first doors without increasing the sliding resistance of the door link mechanism and reducing a degree of freedom in layout.

To achieve the above object, according to the embodiment 2 of the invention, there is provided the air conditioner for the vehicle, wherein the door link mechanism for controlling operations of the plurality of doors in the air conditioner casing according to the selected outlet switching mode is collectively disposed. The door link mechanism has the door levers for the door shafts of the plurality of doors, respectively. The door link is coupled to each of the door levers by engagement of the pin in the cam groove. The first mode for opening the first doors and fully closing the second doors out of the plurality of doors is provided as the outlet switching mode. The link retaining device is provided, between the first door link for the first doors and the second door lever of the second doors, to retain the link position so that the first door link does not move from the prescribed position when the first mode is selected and to cancel retention of the link position when another mode is selected.

Therefore, in the air conditioner for the vehicle according to the embodiment 2 of the invention, when the first mode for opening the first doors and fully closing the second doors is selected, the link retaining device provided between the first door link for the first doors and the second door lever for the second doors retains the link position so that the first door link does not move from the prescribed position. When another mode is selected after the first mode, retention of the link position by the link retaining device is cancelled.

In other words, if the force due to wind pressure acts on the door faces when the first doors are open, the first doors do not move in the turning direction in which operations of the door lever and the door link for the first doors is restricted, the door lever and the door link coupled by engagement of the pin in the cam groove. However, the first doors easily move in the turning direction in which the operations are not restricted due to the backlash between the cam groove and the pin at the coupled portions.

To address it, the link retaining device retains the link position so that the first door link does not move from the prescribed position in the turning direction in which the operations are not restricted. At this time, the door closing force due to the wind pressure and the door pressure receiving areas generates in the fully closed second doors. As a result, the link retaining device provided between the first door link and the second door lever retains the link position by utilizing the door closing force due to the wind pressure as the link retaining force.

Because the link retaining device utilizes the door closing force of the fully closed second doors due to the wind pressure as described above, it is unnecessary to increase the sliding resistance between the cam groove and the pin.

Moreover, for example, to give priority to the lock mechanism for the link retention, changes of set positions of the door link and the door lever, addition of the lock mechanism, and the like are required, which reduces a degree of freedom in layout of the link mechanism. On the other hand, the link retaining device provided between the first door link and the second door lever can be disposed without giving priority to the lock mechanism. No only that, it can be disposed while giving priority to the layout because it is easy to form the link retaining device when a distance between the first door link and the second door lever is shorter.

As a result, it is possible to retain the door opening degrees of the first doors without increasing the sliding resistance of the door link mechanism and reducing a degree of freedom in layout when the first doors are open and the force due to wind pressure acts on the door faces of the first doors.

Operation when each of the vent mode, the bi-level mode, the defroster/foot mode that are switching modes of the outlets is selected will be described below.

[When the Vent Mode is Selected]

Figure 12A:
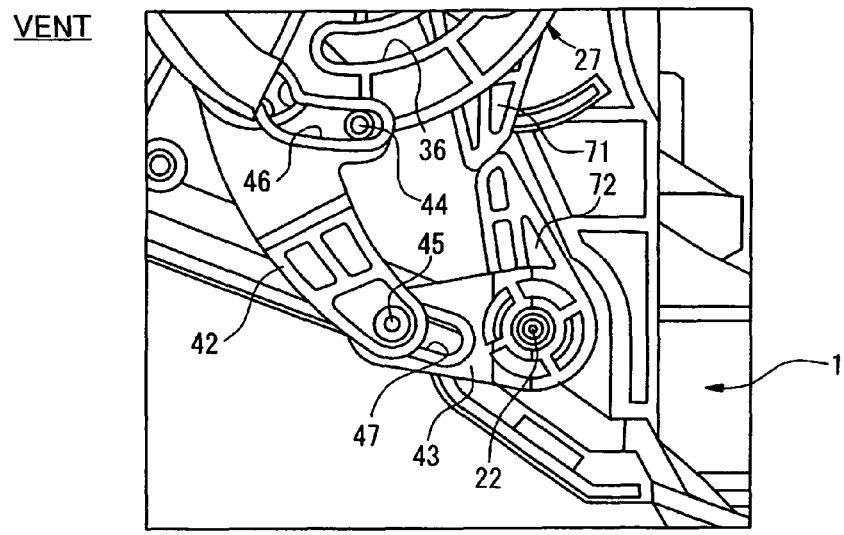
FIG. 12A is a drawing showing vent door link retaining operation and settings of the respective doors when the vent mode is selected and showing a vent door link extension portion 71 and a foot lever stopper portion 72.
Figure 12B:
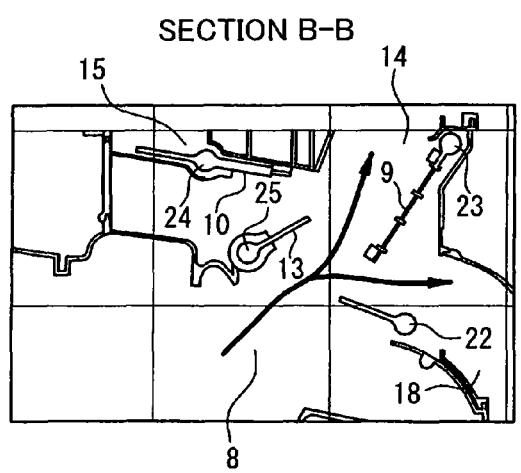
FIG. 12B is a sectional view taken along the line B-B in FIG. 2 when the vent mode is selected and showing the vent door link retaining operation and settings of the respective doors when the vent mode is selected.
Figure 12C:
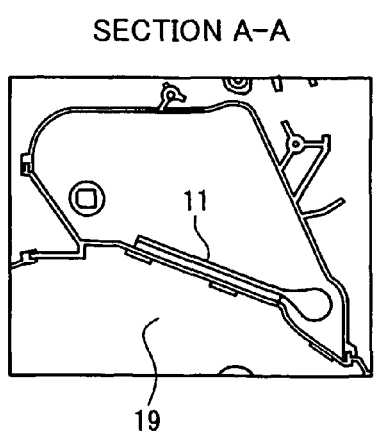
FIG. 12C is a sectional view taken along the line A-A in FIG. 2 when the vent mode is selected and showing the vent door link retaining operation and settings of the respective doors when the vent mode is selected.

FIG. 12A is a drawing showing vent door link retaining operation and settings of the respective doors when the vent mode is selected and showing the vent door link extension portion 71 and the foot lever stopper portion 72. FIG. 12B is a sectional view taken along the line B-B in FIG. 2 when the vent mode is selected and showing the vent door link retaining operation and settings of the respective doors when the vent mode is selected. FIG. 12C is a sectional view taken along the line A-A in FIG. 2 when the vent mode is selected and showing the vent door link retaining operation and settings of the respective doors when the vent mode is selected.

When the vent mode is selected, as shown in FIGS. 12B and 12C, the front vent doors 9 are open and the defroster doors 10 and the foot doors 11 are fully closed. When the vent mode is selected, as shown in FIG. 12B, the temperature adjustment blade 13 is set in such a door position as to direct a flow of air from the air mix chamber 8 toward the front vent outlets 14 and the air distribution amount adjustment blades 12 are set in such door positions as to fully open the distributed air inlets of the rear vent outlet paths 18. When the vent mode is selected, as shown in FIG. 12A, the link retaining device retains the vent door link extension portion 71 with the foot lever stopper portion 72 so that the vent door link 32 does not move in a door closing direction.

[When the Bi-Level Mode is Selected]

Figure 13A:
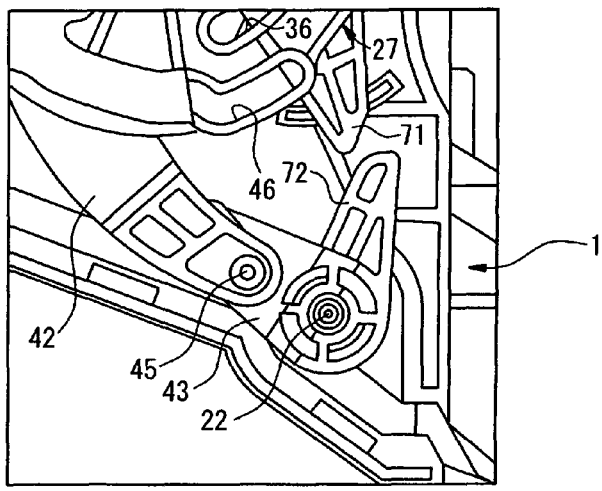
FIG. 13A is a drawing showing vent door link canceling and retracting operation and settings of the respective doors when the bi-level mode is selected and showing the vent door link extension portion 71 and the foot lever stopper portion 72.
Figure 13B:
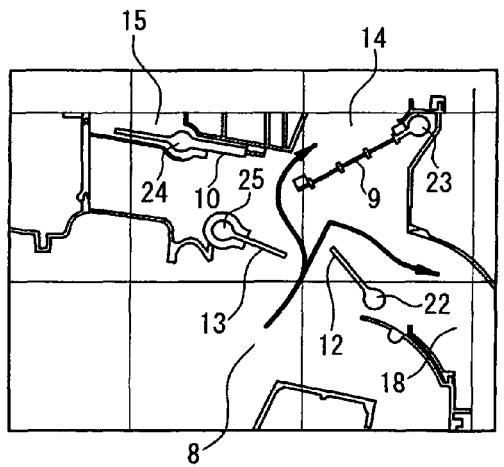
FIG. 13B is a sectional view taken along the line B-B in FIG. 2 when the bi-level mode is selected and showing the vent door link canceling and retracting operation and settings of the respective doors when the bi-level mode is selected.
Figure 13C:
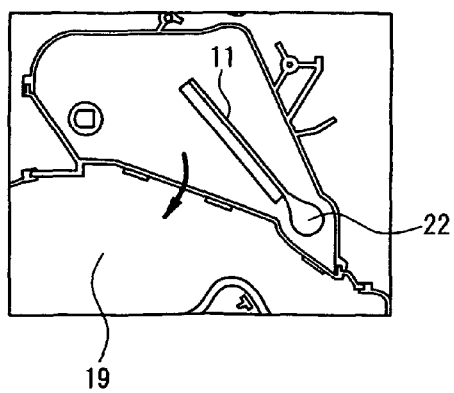
FIG. 13C is a sectional view taken along the line A-A in FIG. 2 when the bi-level mode is selected and showing the vent door link canceling and retracting operation and settings of the respective doors when the bi-level mode is selected.

FIG. 13A is a drawing showing vent door link canceling and retracting operation and settings of the respective doors when the bi-level mode is selected and showing the vent door link extension portion 71 and the foot lever stopper portion 72. FIG. 13B is a sectional view taken along the line B-B in FIG. 2 when the bi-level mode is selected and showing the vent door link canceling and retracting operation and settings of the respective doors when the bi-level mode is selected. FIG. 13C is a sectional view taken along the line A-A in FIG. 2 when the bi-level mode is selected and showing the vent door link canceling and retracting operation and settings of the respective doors when the bi-level mode is selected.

When the bi-level mode is selected, as shown in FIGS. 13A, 13B, and 13C, the front vent doors 9 and the foot doors 11 are half open and the defroster doors 10 are fully closed. When the bi-level mode is selected, as shown in FIG. 13B, the temperature adjustment blade 13 is set in such a door position as to be orthogonal to the flow of air from the air mix chamber 8 and the air distribution amount adjustment blades 12 are set in such door positions as to half open the distributed air inlets of the rear vent outlet paths 18. If the selected mode is switched from the vent mode to the bi-level mode, retention of the vent door link 32 is cancelled while the foot lever stopper portion 72 retracts from the vent door link extension portion 71 in operative association with the mode changing operation.

[When the Defroster/Foot Mode is Selected]

Figure 14A:
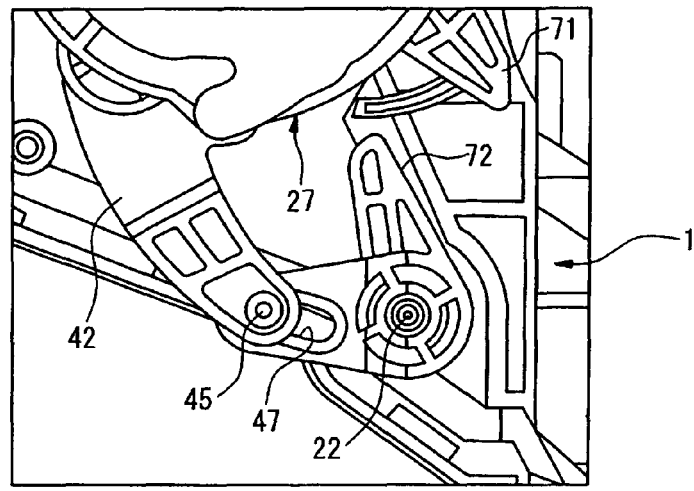
FIG. 14A is a drawing showing vent door link retracting operation and settings of the respective doors when the defroster/foot mode is selected and showing the vent door link extension portion 71 and the foot lever stopper portion 72.
Figure 14B:
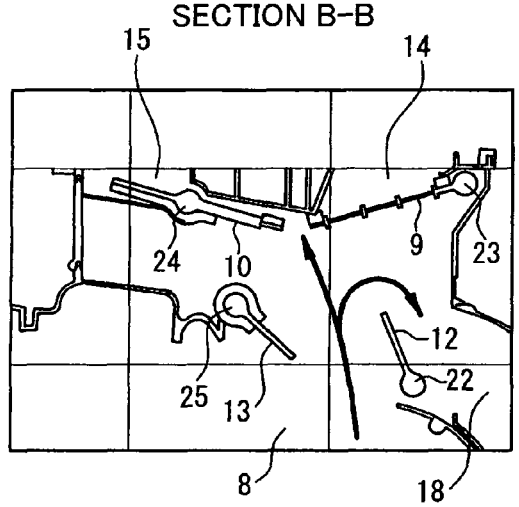
FIG. 14B is a sectional view taken along the line B-B in FIG. 2 when the first defroster/foot mode is selected and showing the vent door link retracting operation and settings of the respective doors when the defroster/foot mode is selected.
Figure 14C:
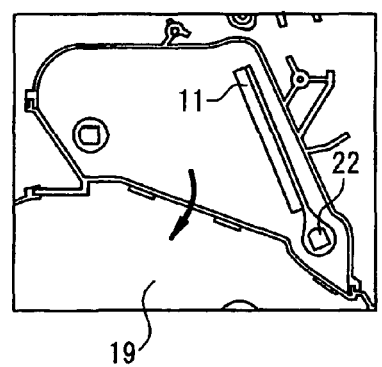
FIG. 14C is a sectional view taken along the line A-A in FIG. 2 when the first defroster/foot mode is selected and showing the vent door link retracting operation and settings of the respective doors when the defroster/foot mode is selected.

FIG. 14A is a drawing showing vent door link retracting operation and settings of the respective doors when the defroster/foot mode is selected and showing the vent door link extension portion 71 and the foot lever stopper portion 72. FIG. 14B is a sectional view taken along the line B-B in FIG. 2 when the first defroster/foot mode is selected and showing the vent door link retracting operation and settings of the respective doors when the defroster/foot mode is selected. FIG. 14C is a sectional view taken along the line A-A in FIG. 2 when the first defroster/foot mode is selected and showing the vent door link retracting operation and settings of the respective doors when the defroster/foot mode is selected.

When the defroster/foot mode is selected, as shown in FIGS. 14A, 14B, and 14C, the front vent doors 9 are fully closed, the defroster doors 10 are slightly open, and the foot doors 11 are fully open. When the defroster/foot mode is selected, as shown in FIG. 14B, the temperature adjustment blade 13 is in such a door position as to direct the flow of air from the air mix chamber 8 toward the defroster outlets 15 and the air distribution amount adjustment blades 12 are set in such door positions as to limit the distributed air inlets of the rear vent outlet paths 18 to a minimum. If the selected mode is switched from the bi-level mode to the defroster/foot mode, the foot lever stopper portion 72 retracts farther from the vent door link extension portion 71 in operative association with the mode changing operation.

[Vent Door Link Retaining Operation when the Vent Mode is Selected]

In the embodiment 2, as shown in FIG. 15, out of the first pin 34 and the second pin 35 provided to the vent door link 32, the first pin 34 is engaged in the vent door link cam groove 36 formed in the main link 27 and the second pin 35 is engaged in the vent door lever cam groove 37 formed in the vent door lever 33. This is because it is necessary to control operations, for example, while changing a door opening degree of one mode door, to retain door opening degrees of the other mode doors, if the door link mechanism 20 is collectively disposed and one door actuator 21 controls open/close operations of the plurality of doors.

If the assumption is made that the structure does not have the retaining device of the vent door link 32 (the structure excluding hatched portions in FIG. 15), when the vent mode is selected and the front vent doors 9 are open, air flows along outlet-side surfaces of the door faces of the front vent doors 9 and flows to a back side of the door faces as shown in FIG. 15 and the force due to wind pressure acts in such a direction as to close the front vent doors 9. In this case, link operation of the vent door link 32 is restricted by reduction in backlash in the pin coupled portion and the front vent doors 9 do not turn in a direction of an arrow C in which the front vent doors 9 try to open further. However, in a direction of an arrow D that is the closing direction of the front vent doors 9, there is a clearance due to the reduction in backlash on one side and no restricting force acts. Therefore, due to backlash between the vent door link cam groove 36 and the first pin 34 and backlash between the vent door lever cam groove 37 and the second pin 35, the vent door link 32 and the vent door lever 33 move easily. As a result, flaps due to changes in the door opening degrees of the front vent doors 9 occur when the vent mode is selected, which is undesirable in terms of sound vibration.

As a solution for the flaps of the doors, a washer (e.g., an urethane washer) for applying sliding resistance to sliding faces of the cam groove and the pin may be used in some cases. In this case, the sliding resistance is applied generally, which increases door actuating torque and requires a high-torque large door actuator. If the door actuating torque is insufficient, the pin may stop in a wrong position in reciprocation along the cam groove.

Moreover, if the door link mechanism is produced while giving priority to the layout, a lock mechanism for solving the flaps of the door may not be produced in some cases. Therefore, priority may be given to the lock mechanism for the door link retention. In this case, however, changes in positions where the door links and the door levers are set and addition of the lock mechanism are required, which reduces the degree of freedom in layout of the door link mechanism.

On the other hand, in the air conditioner unit A/U in the embodiment 2, when the vent mode for opening the front vent doors 9 and fully closing the foot doors 11 is selected, as shown in FIG. 15, the vent door link extension portion 71 and the foot lever stopper portion 72 as the link retaining device are provided between the vent door link 32 for the front vent doors 9 and the foot door lever 43 for the foot doors 11.

Therefore, if the force in the direction of the arrow D for closing the front vent doors 9 acts due to wind pressure when the front vent doors 9 are open, the foot lever stopper portion 72 holds the vent door link extension portion 71, in a direction in which operation for closing the front vent doors 9 is not restricted, to thereby retain the link position so that the vent door link 32 does not move from the prescribed position. At this time, door closing force produced by wind pressure and door pressure receiving areas acts on the fully closed foot doors 11 as shown by an arrow E in FIG. 15. As a result, the vent door link extension portion 71 and the foot lever stopper portion 72 provided between the vent door link 32 and the foot door lever 43 retain the link position by using the door closing force produced by the wind pressure as force for retaining the vent door link 32.

Because the vent door link extension portion 71 and the foot lever stopper portion 72 as the link retaining device utilize the door closing force of the fully closed foot doors 11 and produced by the wind pressure as described above, it is unnecessary to increase the sliding resistance between the cam groove and the pin. In other words, the high-torque large door actuator for responding to the increase in the door actuating torque need not be used and the pin does not stop in a wrong position in reciprocation along the cam groove due to the insufficient door actuating torque.

Moreover, the vent door link extension portion 71 and the foot lever stopper portion 72 as the link retaining device can be disposed without giving priority to the lock mechanism. No only that, they can be disposed while giving priority to the layout because it is easy to form the vent door link extension portion 71 and the foot lever stopper portion 72 when a distance between the vent door link 32 and the foot door lever 43 is shorter. In other words, even if the door link mechanism 20 is produced while giving priority to the layout, compact layout of the door link mechanism 20 is not impaired at all, if the link retaining device is added.

Next, effects will be described. With the air conditioner unit A/U in the embodiment 2, the effects listed below can be obtained.

(6) In an air conditioner for a vehicle, the door link mechanism 20 for controlling operations of a plurality of doors in the air conditioner casing 1 according to the selected outlet switching mode is collectively disposed. The door link mechanism 20 has the door levers for the door shafts of the plurality of doors, respectively. The door link is coupled to each of the door levers by engagement of the pin in the cam groove. The first mode for opening the first doors and fully closing the second doors out of the plurality of doors is provided as the outlet switching mode. The link retaining device 71, 72 are provided, between the first door link for the first doors and the second door lever of the second doors, to retain the link position so that the first door link does not move from a prescribed position when the first mode is selected and to cancel retention of the link position when another mode is selected. Therefore, it is possible to retain the door opening degrees of the first doors when the first doors are open and even if the force due to the wind pressure acts on the door faces of the first doors without increasing the sliding resistance of the door link mechanism 20 and reducing the degree of freedom in layout.

(2) The link retaining device 71, 72 are the device that are in operative association with mode changing operation from the first mode to another mode and that cancel retention of the first door link while retracting to such positions as not to obstruct operation of the first door link. Therefore, by utilizing the mode changing operation from the first mode to another mode, the link retaining device 71, 72 can achieve retention of, canceling of the retention of, and retraction from the first door link.

(3) The door link mechanism 20 is the mechanism interposed between the door actuator 21 and the plurality of door shafts 22, 23, 24, and 25 provided with the doors and includes the main link 27 controlled by the door actuator 21 to rotate to the rotation angle position corresponding to the selected mode, the plurality of door links 32, 42, 52, and 62 each coupled to the main link 27 by engagement of the pin in the cam groove, and the plurality of door levers 33, 43, 53, and 63 provided with the door shafts 22, 23, 24, and 25, each of the door levers coupled to each of the door links 32, 42, 52, and 62 by engagement of the pin in the cam groove. The link retaining device include the first link extension portion 71 formed to extend from the first door link of the first doors and the second lever stopper portion 72 formed to extend from the second door lever of the second doors. The second lever stopper portion 72 retains the first link extension portion 71 so that the first door link does not move in the door closing direction when the first mode is selected and cancels retention of the first door link while retracting in operative association with the mode changing operation from the first mode to another mode. Therefore, the number of parts does not increase in forming the link retaining device and the link retaining device can be formed of the first link extension portion 71 and the second lever stopper portion 72, which is advantageous in cost and space.

(4) The first door link for the first door is the vent door link 32 for the front vent doors 9. The second door lever for the second doors is the foot door lever 42 for the foot doors 11. The link retaining device 71, 72 retain the link position so that the vent door link 32 does not move from the prescribed position when the vent mode is selected and cancels retention of the link position when another mode is selected. Therefore, by utilizing the door closing force of the foot doors 11, it is possible to achieve retention of the link position of the vent door link 32 when the vent mode is selected and canceling of retention of the link position when another mode is selected after the vent mode.

(5) The door link mechanism 20 has, as a common structure, the main link 27 turned about the main link shaft 26 by the door actuator 21. The vent door link mechanism in the door link mechanism 20 includes the vent door link 32 for turning about the vent door link shaft 31 and the vent door lever 33 for turning about the vent door shaft 23, the vent door link 32 provided with the first pin 34 and the second pin 35, the first pin 34 engaged in the vent door link cam groove 36 formed in the main link 27, and the second pin 35 engaged in the vent door lever cam groove 37 formed in the vent door lever 33. The foot door link mechanism in the door link mechanism 20 includes the foot door link 42 for turning about the foot door link shaft 41 and the foot door lever 43 for turning about the foot door shaft 22, the foot door link 42 provided with the first pin 44 and the second pin 45, the first pin 44 engaged in the foot door link cam groove 46 formed in the main link 27, and the second pin 45 engaged in the vent door lever cam groove 47 formed in the foot door lever 43. The link retaining device include the vent door link extension portion 71 formed to extend from the vent door link 32 and the foot lever stopper portion 72 formed to extend from the foot door lever 43. Therefore, in spite of the vent door link 32 having much backlash due to engagement of the pins in the cam grooves in two positions, it is possible to reliably retain the link position of the vent door link 32 when the vent mode is selected.

(6) In the link retaining device, the foot lever stopper portion 72 retains the vent door link extension portion 71 so that the vent door link 32 does not move in the door closing direction when the vent mode is selected. The foot lever stopper portion 72 cancels retention of the vent door link 32 while retracting from the vent door link extension portion 71 in operative association with the mode changing operation when the selected mode is changed from the vent mode to the bi-level mode. The foot lever stopper portion 72 retracts farther from the vent door link extension portion 71 in operative association with the mode changing operation when the selected mode is changed from the bi-level mode to the defroster/foot mode. Therefore, the vent door link extension portion 71 and the foot lever stopper portion 72 can achieve retention of, canceling of the retention of, and retraction from the vent door link 32 in an orderly manner by smoothly shifting the operation in operative association with the mode changing operations (the vent mode→the bi-level mode→the defroster/foot mode).

Although the air conditioner for the vehicle according to the invention has been described above based on the embodiment 2, specific structures are not limited to those in the embodiment 2 and changes in and additions to the design are allowed without departing from the gist of the invention according to respective claims.

In the embodiment 2, as the link retaining device, the operation of the vent door link in the door closing direction is restricted in the vent mode in which the front vent doors are open and the foot doors are fully closed when the first doors are the front vent doors, the second doors are the foot doors. However, as long as the door opening degrees are "open" and "fully closed", the link retaining device of the invention may be applied to a case where the first doors and the second doors are doors other than those in the embodiment 2. Moreover, the link retaining device of the invention can be applied to a case of restricting operation in the door opening direction and also to a case of restricting operations in both the door opening and closing directions, if operation in the door closing direction is restricted. In short, the structure is not limited to that in the embodiment 2, if the structure has the first mode for opening the first doors and fully closing the second doors out of the plurality of doors as the outlet switching mode and includes the link retaining device provided between the first door link for the first doors and the second door lever for the second doors for retaining the link position so that the first door link does not move from the prescribed position when the first mode is selected and for canceling retention of the link position when another mode is selected.

In the example shown in the embodiment 2, the link retaining device is formed of the vent door link extension portion 71 formed to extend from the vent door link 32 and the foot lever stopper portion 72 formed to extend from the foot door lever 43. However, the link retaining device may be formed as a separate body and integrally fixed to the door link and the door lever. In this case, the existing door link mechanism may be used as it is and the link retaining device may be added to the door link mechanism.

The invention claims a priority from Japanese Patent Application No. 2006-291975 filed on Oct. 27, 2006 and Japanese Patent Application No. 2006-291976 filed on Oct. 27, 2006 and all filed material including specifications, drawings, and claims of the applications is incorporated herein by reference.

INDUSTRIAL APPLICABILITY

Although the example of the air conditioner unit having the temperature adjustment blade as well as the air distribution amount adjustment blades is shown as the air conditioner for the vehicle in the embodiment 1, it is needless to say that the invention can be applied to an air conditioner unit without a temperature adjustment blade. In short, the invention can be applied to a air conditioner for a vehicle that includes, in an air conditioner casing, a rear vent outlet path and a foot outlet path branching out via an air mix chamber for mixing cold air and hot air.

Although the example of the air conditioner unit having the vent mode, the bi-level mode, the foot mode, the defroster/foot mode, and the defroster mode as the outlet switching modes is shown as the air conditioner for the vehicle in the embodiment 2, it is possible to omit part of the above modes or add other modes as specific outlet switching modes. In short, the invention can be applied to a air conditioner for a vehicle in which a door link mechanism for controlling operations of a plurality of doors in an air conditioner casing according to a selected outlet switching mode is collectively disposed.

The invention claimed is:
1. A vehicle air conditioner comprising:
an air conditioning casing having an air mix chamber, a rear vent outlet path branching out from said air mix chamber, a foot outlet path branching out from said air mix chamber, a defroster outlet communicating with said air mix chamber, and a front vent outlet communicating with said air mix chamber;
a first heat exchanger for cooling air within said air conditioning casing, said first heat exchanger being located at an upstream side of said air conditioning casing with respect to a direction of flow of air through said air conditioning casing;

a second heat exchanger for heating air within said air conditioning casing, said second heat exchanger being located at a downstream side of said air conditioning casing with respect to the direction of flow of air through said air conditioning casing;

an air mix door for controlling a mixture of hot air and cold air, said air mix door being located within said air conditioner casing between said first heat exchanger and said second heat exchanger with respect to the direction of flow of air through said air conditioning casing;

an air distribution amount adjustment blade in said rear vent outlet path for adjusting an amount of air to be distributed from said air mix chamber through said rear vent outlet path;

a door turning shaft controlled by a door actuator connected to said door turning shaft via a foot door link;

a foot door mounted on said door turning shaft so as to be disposed in said foot outlet path, said foot door being configured to open an amount based on a selected operation mode, said air distribution amount adjustment blade being mounted on said door turning shaft so as to be integrally connected to said foot door to limit the amount of air to be distributed from said air mix chamber through said rear vent outlet path based on the amount of opening of said foot door, said door turning shaft being a blade operating shaft for operating said air distribution amount adjustment blade;

a front vent door at said front vent outlet, said air distribution amount adjustment blade being located upstream of said front vent door with respect to the direction of flow of air through said air conditioning casing;

a defroster door at said defroster outlet; and a temperature adjustment blade arranged upstream of said defroster door with respect to the direction of flow of air through said air conditioning casing, and arranged so as to face said air distribution amount adjustment blade;

wherein an opening amount of said foot door is adjustable by controlling an amount of turning of said door turning shaft by said door actuator via said foot door link; and wherein said air conditioning casing, said air mix door, said air distribution amount adjustment blade, said foot door, said front vent door, said defroster door, and said temperature adjustment blade are configured and interconnected to be arranged in a first defroster/foot operation mode and in a second defroster/foot operation mode such that:

in said first defroster/foot mode, said front vent door is fully closed, said defroster door is partially open, said foot door is fully open, said temperature adjustment blade is positioned to direct the flow of air from said air mix chamber toward said defroster outlet, and said air distribution amount adjustment blade is positioned to limit the amount of air to be distributed from said air mix chamber to the rear vent outlet path to a partial amount; and in said second defroster/foot mode, said front vent door is fully closed, said defroster door is half open, said foot door is half open, said temperature adjustment blade is positioned to direct the flow of air from said air mix chamber toward said defroster outlet, and said air distribution amount adjustment blade is positioned to half open said rear vent outlet path.

2. The vehicle air conditioner of claim 1, wherein said rear vent outlet path has a distributed air inlet at an upstream position of said rear vent outlet path adjacent to said air mix chamber, said air distribution amount adjustment blade being positioned in said distributed air inlet of said rear vent outlet path; and wherein said foot outlet path has a distributed air inlet at an upstream position of said foot outlet path adjacent to said air mix chamber, said foot door being positioned in said distributed air inlet of said foot outlet path.

3. The vehicle air conditioner of claim 1, wherein, in an operation mode in which said front vent door is fully open, said defroster door is fully closed, and said foot door is fully closed, said temperature adjustment blade is positioned to direct the flow of air from said air mix chamber toward said front vent outlet and said air distribution amount adjustment blade is positioned to fully open a distributed air inlet of said rear vent outlet path, said distributed air inlet being located at an upstream end of said rear vent outlet path.

4. The vehicle air conditioner of claim 1, wherein, in a bi-level operation mode in which said front vent door is half open, said foot door is half open, and said defroster door is fully closed, said temperature adjustment blade is positioned so as to be orthogonal to the flow of air from said air mix chamber, and said air distribution amount adjustment blade is positioned to half open a distributed air inlet of said rear vent outlet path, said distributed air inlet being located at an upstream end of said rear vent outlet path.

5. The vehicle air conditioner of claim 1, wherein said front vent door in said front vent outlet is open on an extension line of a direction of vertical upward air flowing from said air mix chamber, and said defroster door is open in a position for directing the vertical upward air flowing from said air mix chamber into vertical rearward air.

6. The vehicle air conditioner of claim 1, wherein said air distribution amount adjustment blade is linked to said foot door so as to limit an amount of air distributed from said air mix chamber through said rear vent outlet path according to an amount of opening of said foot door.

* * * * *